(12) United States Patent
Kleindienst et al.

(10) Patent No.: US 12,130,461 B2
(45) Date of Patent: Oct. 29, 2024

(54) FUNCTIONALIZED WAVEGUIDE FOR A DETECTOR SYSTEM

(71) Applicant: Carl Zeiss Jena GmbH, Jena (DE)

(72) Inventors: Roman Kleindienst, Weimar (DE); Christoph Erler, Jena (DE); Petr Vojtisek, jena (DE); Marc Junghans, Jena (DE); Daniel Thomae, Jena (DE); Mirko Riethmueller, Leipzig (DE); Matthias Burkhardt, Eichenberg (DE); Alexandre Gatto, Jena-Muenchenroda (DE); Andreas Luetz, Dornburg-Camburg (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 17/427,265

(22) PCT Filed: Jan. 31, 2020

(86) PCT No.: PCT/EP2020/052482
§ 371 (c)(1),
(2) Date: Jul. 30, 2021

(87) PCT Pub. No.: WO2020/157306
PCT Pub. Date: Aug. 6, 2020

(65) Prior Publication Data
US 2022/0146752 A1    May 12, 2022

(30) Foreign Application Priority Data
Feb. 1, 2019 (DE) .......................... 102019102604.0

(51) Int. Cl.
*F21V 8/00* (2006.01)
*G02B 6/00* (2006.01)
(Continued)

(52) U.S. Cl.
CPC ......... *G02B 6/0015* (2013.01); *G02B 6/0018* (2013.01); *G02B 6/0033* (2013.01);
(Continued)

(58) Field of Classification Search
None
See application file for complete search history.

(56) References Cited

U.S. PATENT DOCUMENTS 4,868,803 A    9/1989 Sunagawa et al.
5,757,755 A    5/1998 Nagano
(Continued)

FOREIGN PATENT DOCUMENTS

CN    107462993 A    12/2017
CN    107797287 A    3/2018
(Continued)

OTHER PUBLICATIONS

Kim et al. "Holographic Optical Elements and Application", IntechOpen, Mar. 22, 2017, https:www.intechopen.com/chapters/54090. (Year: 2017).*
(Continued)

*Primary Examiner* — Michelle R Connelly
(74) *Attorney, Agent, or Firm* — Skaar Ulbrich Macari, P.A.

(57) ABSTRACT

A waveguide for a detector system includes a transparent main body with a partially transparent incoupling region and a decoupling region that is spaced apart therefrom in a first direction. The incoupling region includes a diffractive structure which deflects only part of radiation coming from an object to be detected and impinging on the front face such that the deflected part propagates as coupled-in radiation in the main body by reflections up to the decoupling region and impinges on the decoupling region. The decoupling region deflects at least part of the coupled-in radiation impinging
(Continued)

thereon such that the deflected part exits the main body via the front face or rear face in order to impinge on the detector system. The extent of the incoupling region in a second direction transverse to the first direction is greater than the extent of the decoupling region in the second direction.

21 Claims, 22 Drawing Sheets

(51) Int. Cl.
*G02B 27/01* (2006.01)
*G02B 27/42* (2006.01)
*G02B 21/36* (2006.01)
*G02B 27/18* (2006.01)

(52) U.S. Cl.
CPC ....... *G02B 6/0035* (2013.01); *G02B 27/0103* (2013.01); *G02B 27/4205* (2013.01); *G02B 21/361* (2013.01); *G02B 2027/0138* (2013.01); *G02B 2027/0174* (2013.01); *G02B 27/18* (2013.01)

(56) References Cited

U.S. PATENT DOCUMENTS

| | | |
|---|---|---|
| 5,856,842 A | 1/1999 | Tedesco |
| 5,991,480 A | 11/1999 | Kunz et al. |
| 10,254,542 B2 * | 4/2019 | Kollin ................ G03B 21/2066 |
| 2005/0012842 A1 | 1/2005 | Miyagawa et al. |
| 2006/0132914 A1 | 6/2006 | Weiss et al. |
| 2009/0097122 A1 | 4/2009 | Niv |
| 2009/0244706 A1 | 10/2009 | Levola et al. |
| 2010/0177388 A1 | 7/2010 | Cohen et al. |
| 2010/0302344 A1 | 12/2010 | Large et al. |
| 2011/0019258 A1 | 1/2011 | Levola |
| 2012/0001833 A1 | 1/2012 | Lindig et al. |
| 2014/0218801 A1 | 8/2014 | Simmonds et al. |
| 2014/0300966 A1 | 10/2014 | Travers et al. |
| 2014/0362447 A1 * | 12/2014 | Simmonds ......... G02B 27/4272 359/630 |
| 2015/0185475 A1 * | 7/2015 | Saarikko ............ G02B 6/02085 382/117 |
| 2015/0279114 A1 | 10/2015 | Yonekubo |
| 2016/0139402 A1 | 5/2016 | Lapstun |
| 2016/0209657 A1 | 7/2016 | Popovich et al. |
| 2017/0153460 A1 | 6/2017 | Vallius |
| 2017/0205618 A1 | 7/2017 | Basset et al. |
| 2017/0212289 A1 | 7/2017 | Wiltshire et al. |
| 2017/0255813 A1 | 9/2017 | Chen et al. |
| 2017/0299794 A1 | 10/2017 | Fattal |
| 2017/0299865 A1 | 10/2017 | Vallius et al. |
| 2018/0046859 A1 | 2/2018 | Jarvenpaa |
| 2018/0113309 A1 | 4/2018 | Robbins et al. |
| 2018/0232048 A1 | 8/2018 | Popovich et al. |
| 2018/0252857 A1 | 9/2018 | Glik et al. |
| 2018/0275350 A1 | 9/2018 | Oh et al. |
| 2018/0292593 A1 | 10/2018 | Alexander |
| 2018/0292676 A1 * | 10/2018 | Alexander ............. G02C 7/086 |
| 2019/0011708 A1 | 1/2019 | Schultz et al. |
| 2019/0041634 A1 | 2/2019 | Popovich et al. |
| 2019/0086674 A1 * | 3/2019 | Sinay .................. G02B 27/283 |
| 2019/0187465 A1 | 6/2019 | Erler et al. |
| 2019/0353898 A1 * | 11/2019 | Amirsolaimani ........ G02B 6/42 |
| 2019/0377181 A1 | 12/2019 | Myhre et al. |
| 2020/0026074 A1 | 1/2020 | Waldern et al. |
| 2020/0106939 A1 | 4/2020 | Yang et al. |
| 2020/0271928 A1 | 8/2020 | Schwartze et al. |
| 2020/0393681 A1 * | 12/2020 | Eskolin .................... H04N 5/33 |
| 2022/0272258 A1 | 8/2022 | Moll |

FOREIGN PATENT DOCUMENTS

| | | | |
|---|---|---|---|
| CN | 108469704 A | 8/2018 | |
| CN | 109031663 A | 12/2018 | |
| DE | 102010041349 A1 * | 3/2012 | ........... G02B 27/017 |
| DE | 102016211823 A1 | 1/2018 | |
| EP | 3742662 A1 | 11/2020 | |
| JP | H06 68379 A | 3/1994 | |
| JP | H07 12938 A | 1/1995 | |
| JP | H07272311 A | 10/1995 | |
| JP | 2007531919 A | 11/2007 | |
| JP | 2017520764 A | 7/2017 | |
| WO | WO-2016112130 A1 * | 7/2016 | ......... G02B 27/0172 |
| WO | WO-2018125574 A1 * | 7/2018 | ......... G02B 27/0172 |
| WO | 2018231754 A1 | 12/2018 | |
| WO | WO-2019106233 A1 * | 6/2019 | ............. B60K 35/00 |

OTHER PUBLICATIONS

Zhenlv LV et al.; "Integrated holographic waveguide display system with a common optical path for visible and Infrared light"; Optics Express 32802; vol. 26, No. 25, Dec. 10, 2018; 10 pages.
International Preliminary Report on Patentability rendered by the International Bureau of WIPO for PCT/EP2020/052482, dated Jul. 27, 2021, 6 pages.

* cited by examiner

Fig. 11A  Fig. 11C  Fig. 11E
   Fig. 11B  Fig. 11D  Fig. 11F
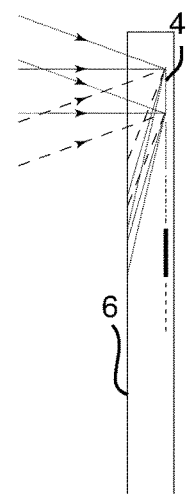
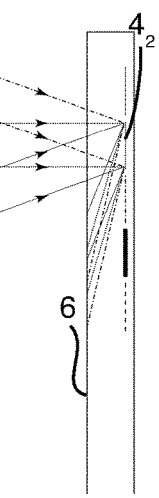
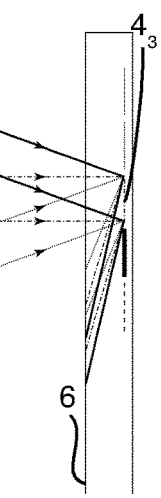
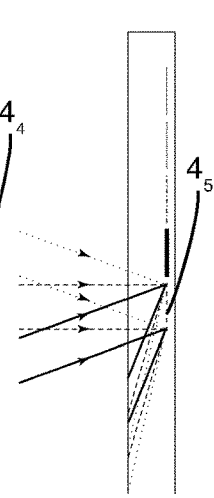
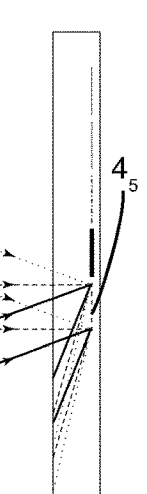
Fig. 12
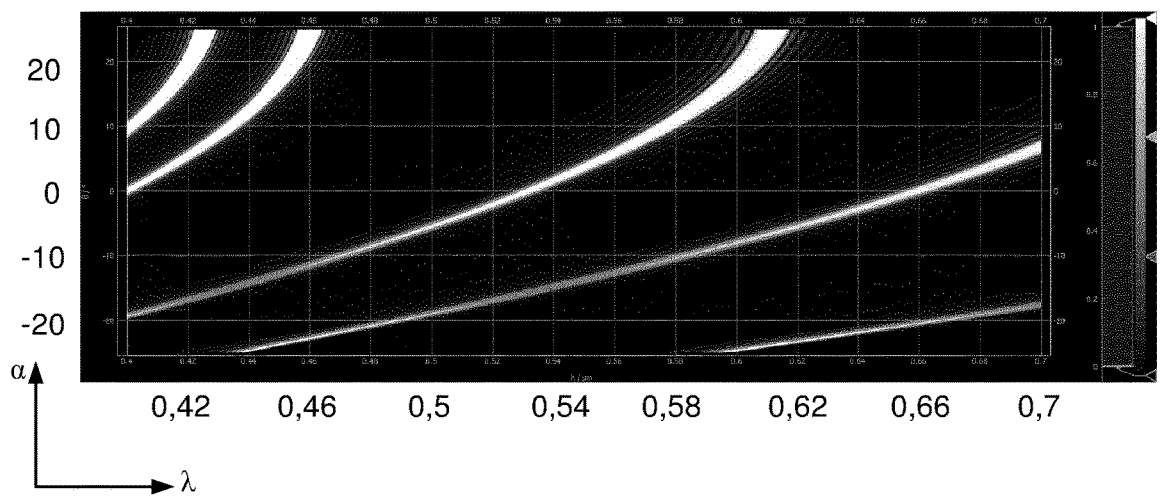

Fig. 14A  Fig. 14C  Fig. 14E
Fig. 14B  Fig. 14D  Fig. 14F
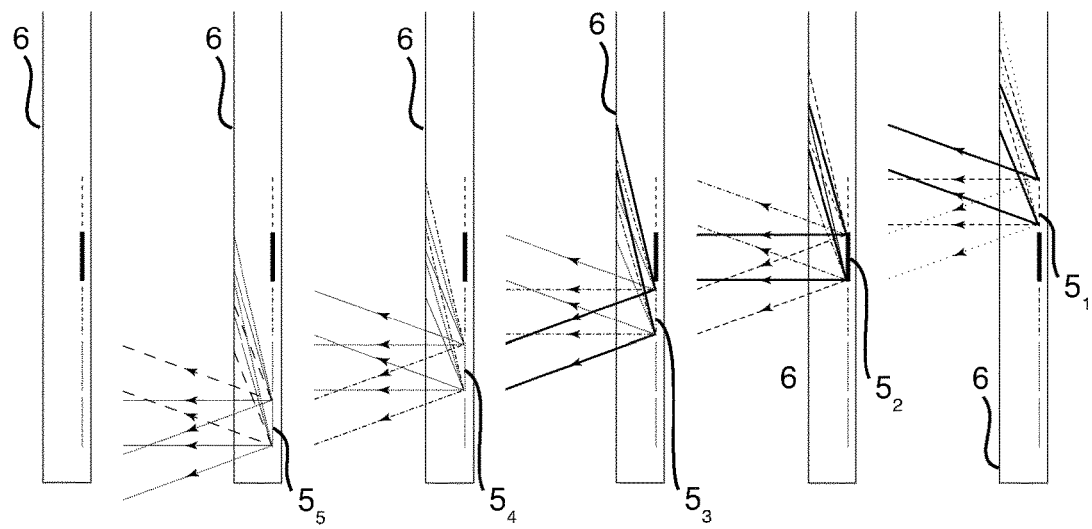
Fig. 15
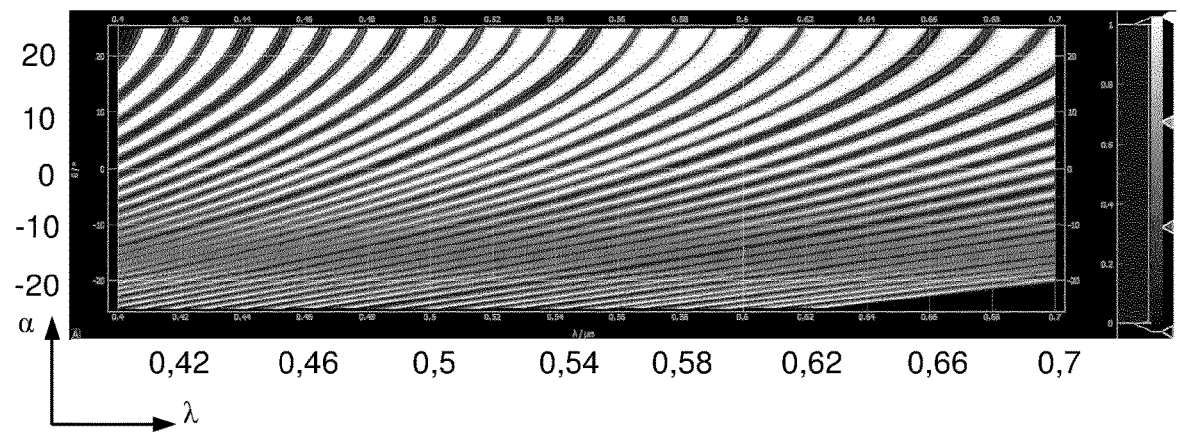

Fig. 18A
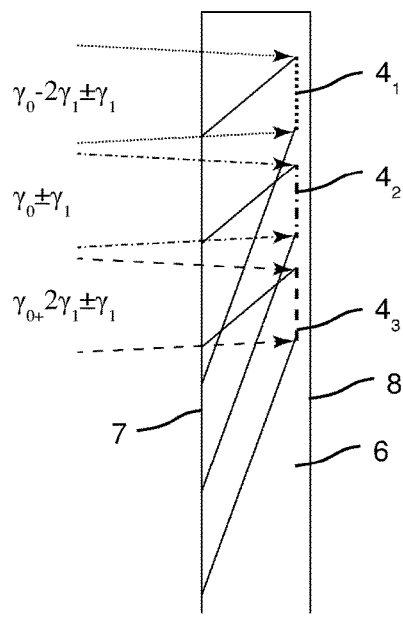
Fig. 18B
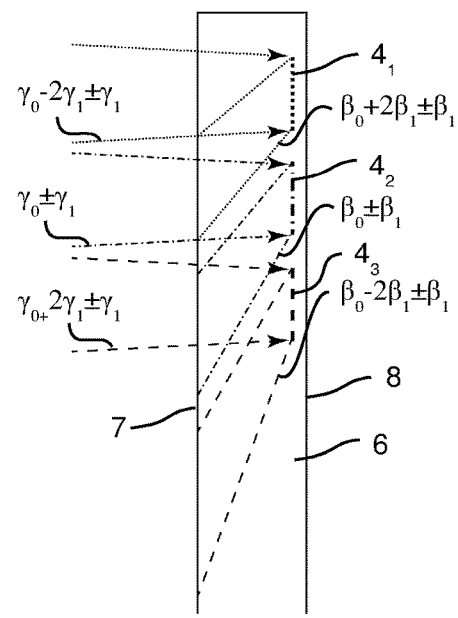
Fig. 19A  Fig. 19B  Fig. 19C
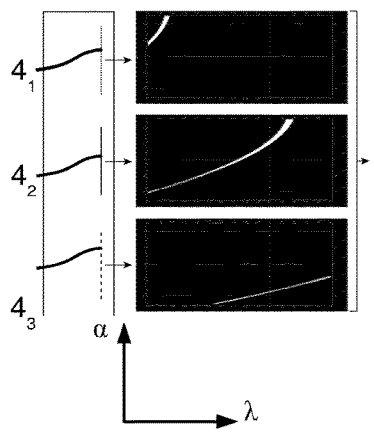
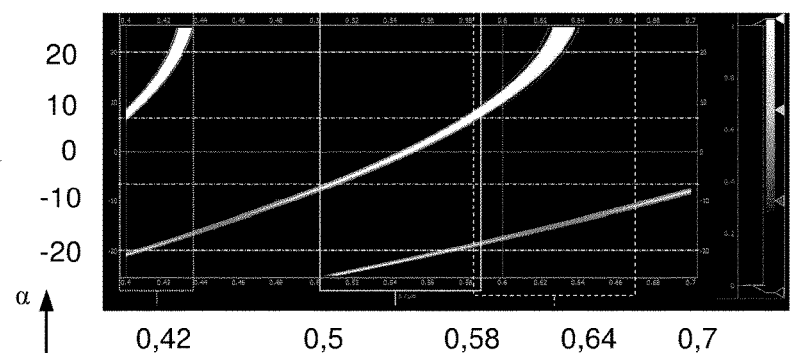

FUNCTIONALIZED WAVEGUIDE FOR A DETECTOR SYSTEM

PRIORITY

This application claims the priority of German patent application DE 10 2019 102 604.0, filed Feb. 1, 2019, which is hereby incorporated herein by reference in its entirety.

FIELD

The present invention relates to a functionalized waveguide for a detector system.

BACKGROUND

Transparent surfaces composed of glass or plastic such as, for example, windows or windshields in automobiles comprise a transparent base body and generally serve only to protect persons or objects against environmental influences such as wind, temperature, particles or radiation.

There is increasingly an interest in making available such a transparent base body which provides an additional optical functionality.

SUMMARY

Therefore, it is an object of certain embodiments of the invention to provide a transparent base body having an additional optical functionality.

In the case of the functionalized waveguide according to certain embodiments, a partly transparent input coupling region and an output coupling region spaced apart therefrom in a first direction are provided or embodied in the transparent base body. The partly transparent input coupling region can comprise a diffractive structure used to maintain the transparency of the input coupling region during normal viewing through it in a large angular and wavelength range. It is thus possible for only a portion of the radiation impinging on a front side of the transparent base body to be deflected by means of the transparent input coupling region such that the deflected portion propagates as coupled-in radiation into the base body as far as the output coupling region by means of reflection and impinges on the output coupling region.

In this case, the transparency of the input coupling region is dependent on the efficiency of the input coupling of radiation. As the input coupling efficiency increases, there is also a decrease in the transparency in the input coupling region of the functionalized waveguide. With the aim of the highest possible transparency, the input coupling of radiation by means of e.g. the diffractive structure (in particular the at least one volume hologram) may be precisely so efficient that a sufficient radiation power impinges on the output coupling region. The partly transparent input coupling region can be embodied such that the input coupling efficiency is e.g. 2%, 5%, 10%, 15%, 20%, 25%, 30%, 35%, 40%, 45% or 50%. In particular, the input coupling efficiency can be in the range of 2%-50%, such that the transparency of the input coupling region is in the range of 50%-98%. The input coupling region(s) of the further exemplary embodiments can also comprise such input coupling efficiencies or such transmissive properties.

The transparent input coupling region is preferably embodied such that the deflection of the deflected portion of the radiation impinging on the front side of the transparent base body is effected as pure deflection that is free of an imaging optical function (e.g. free of a focusing effect).

The reflections can be in particular total internal reflections at the front and/or rear side of the transparent base body. However, it is also possible for reflective layers or coatings or partly reflective layers or coatings to be provided for this purpose.

The front and rear sides of the partly transparent body can be embodied as plane surfaces. In this regard, the partly transparent base body can be embodied as a plane-parallel plate, for example.

However, it is also possible for the front side and/or the rear side to be embodied as curved.

The partly transparent base body can consist of glass and/or plastic. It can be integral or comprise a multilayered construction.

In particular, the transparent base body can be transparent to radiation or light from the visible wavelength range. Furthermore, a transparency to the near infrared and/or the infrared range can be present.

The output coupling region of the transparent base body can deflect at least one portion of the coupled-in radiation impinging on it, such that the deflected portion emerges from the base body. This is preferably effected via the front side or rear side of the transparent base body.

The output coupling region can be embodied as partly transparent. In particular, the output coupling efficiency of the output coupling region can be e.g. 2%, 5%, 10%, 15%, 20%, 25%, 30%, 35%, 40%, 45% or 50%. In particular, the output coupling efficiency of the output coupling region can be in the range of 2%-50%, such that the transparency of the output coupling region is in the range of 50%-98%. The output coupling region(s) of the further exemplary embodiments can also comprise such output coupling efficiencies or such transmissive properties.

The partly transparent embodiment is advantageous, for example, if the input coupling region and the output coupling region are embodied as diffractive structures (e.g. as volume holograms). The input coupling region and the output coupling region can then be embodied e.g. in a film, which is advantageous from the standpoint of production engineering.

However, it is also possible for the output coupling region to comprise a maximum output coupling efficiency. This can be realized for example by means of a reflective coating (preferably complete reflective coating).

The input coupling region and the output coupling region can be embodied such that they do not bring about an optical imaging function besides the deflection. However, it is also possible for the input coupling region and/or the output coupling region to provide an optical imaging function in addition to the deflection and thus to bring about an optical imaging. In this regard, the optical imaging function can realize for example the function of a converging lens element or diverging lens element, a concave or convex mirror, wherein the curved surfaces can be (centered or decentered) spherically curved or aspherically curved surfaces.

The diffractive structure of the input coupling region can be realized as a buried diffractive structure, as a diffractive structure between two substrates or as a diffractive structure embodied on the front or rear side.

Furthermore, the output coupling region can comprise a diffractive structure. The diffractive structure of the output coupling region can be embodied as a buried diffractive structure or as a diffractive structure on the front side or rear side.

A reflective or transmissive volume hologram can be provided as a diffractive structure of the input coupling region and/or of the output coupling region. Furthermore, it is possible for the diffractive structure of the output coupling and/or input coupling region to be a transmissive or reflective relief grating.

The output coupling region can furthermore comprise a mirror surface, a prism and/or a reflective or transmissive Fresnel structure. These variants can be provided as an alternative to the diffractive structure or in addition to the diffractive structure of the output coupling region.

Furthermore, a detector system comprising a functionalized waveguide (including all developments) is also provided. The detector system, also called detection system hereinafter, can comprise a detector, on which that portion of the radiation which is deflected by the output coupling region impinges. The detector can be connected to the front side or the rear side of the base body. In particular, a direct connection can be present. The detector can be a digital image sensor (e.g. a CCD sensor or a CMOS sensor), a detector array or e.g. a solar cell.

Furthermore, the detector system can be embodied such that at least one optically imaging element is arranged in the region between the detector and the front and/or rear side. The at least one optically imaging element can be embodied e.g. as a lens, as a refractive lens or as a refractive camera lens. It is also possible for the region between the detector and the front and/or rear side to be free of imaging optical elements. In other words, the radiation coupled out from the output coupling region thus impinges on the detector without having passed through further optically imaging elements. In this case, it is advantageous if the output coupling region comprises an optically imaging property in addition to the deflection.

The functionalized waveguide can be embodied such that it carries out an infinite-infinite imaging. However, it is also possible for said waveguide to carry out a finite-infinite imaging, an infinite-finite imaging or a finite-finite imaging.

The detector system can, of course, also be embodied such that at least one optically imaging element is also arranged between the detector and the front and/or rear side. The at least one optically imaging element serves in particular for guiding that portion of the radiation which is deflected by the output coupling region, and can be embodied e.g. as a lens element. The at least one optically imaging element can be embodied e.g. as a lens, as a refractive lens or as a refractive camera lens.

In the case of the functionalized waveguide, the extent of the input coupling region in a second direction transverse to the first direction can be greater than the extent of the output coupling region in the second direction. Extent (or e.g. width) of the input coupling region is understood here to mean in particular the extent that is used effectively as intended or the optically used extent. This is for example the extent of the section of the input coupling region from which the deflected radiation impinges on the detector system. Extent (or e.g. width) of the output coupling region is understood here to mean in particular the extent that is used effectively as intended or the optically used extent. This is for example the extent of the section of the output coupling region from which the deflected radiation impinges on the detector system.

Furthermore, the input coupling region and the output coupling region can be arranged in a manner centered with respect to one another in the second direction.

However, it is also possible for the input coupling region and the output coupling region to be arranged in a manner decentered with respect to one another in the second direction.

Provision can be made of a plurality of output coupling regions arranged next to one another in the second direction. At least one of the output coupling regions can additionally comprise the function of deflection transversely to the first direction.

It is possible for the field of view (called "FoV" hereinafter) of the functionalized waveguide to be coordinated with the FoV of the detector (or of the detector with the at least one optically imaging element, e.g. a lens). This can be carried out in particular by means of an adaptation of the distance between the input coupling region and the output coupling region along the first direction and the extent of the input coupling region transversely to the first direction and the extent of the output coupling region transversely to the first direction. An adaptation of the FoV of the detector (or of the detector with the at least one optically imaging element) to the FoV of the functionalized waveguide can be effected by means of an adaptation of the lens focal length and/or the size of the detector. Preferably, the FoV of the functionalized waveguide corresponds to the FoV of the detector (or of the detector with the at least one optically imaging element). This can be effected by means of a targeted setting of the FoV of the functionalized waveguide and/or a targeted setting of the FoV of the detector (or of the detector with the at least one optically imaging element).

A functionalized waveguide for an illumination and/or projection system is furthermore provided, wherein the waveguide comprises a transparent base body having a front side and a rear side. In principle, the transparent base body can be embodied and developed in the same way as the transparent base body for the functionalized waveguide for the detector system.

In this regard, the base body can comprise an input coupling region and an output coupling region spaced apart therefrom in a first direction, wherein the input coupling region deflects at least one portion of radiation coming from the light or image source of the illumination and/or projection system and impinging on the input coupling region, such that the deflected portion propagates as coupled-in radiation in the base body as far as the output coupling region by means of reflection and impinges on the output coupling region. The output coupling region can comprise a structure, e.g. a diffractive structure, which deflects the coupled-in radiation impinging on it, such that the deflected portion emerges from the base body via the front side and rear side. The diffractive structure can be adapted to the wavelengths of the radiation coming from the light or image source such that as much radiation as possible is reflected. Nevertheless, the diffractive structure can still comprise the desired transparency upon viewing through it, for example. Furthermore, it is possible for the diffractive structure to deflect only a portion of the radiation from the light or image source.

The structure of the output coupling region can be a transmissive or reflective diffractive structure, a transmissive or reflective volume hologram, a mirror surface, a prism or a transmissive or reflective relief grating.

An output coupling region that is transparent is thus provided. The extent of the output coupling region in a second direction transverse to the first direction can be greater than the extent of the input coupling region in the second direction.

An illumination and/or projection system with a functionalized waveguide for such an illumination and/or projection system is furthermore provided, wherein a light and/or image source is additionally provided, the light from which impinges on the input coupling region.

In the case of the functionalized waveguide for a detector system, the input coupling region can comprise at least two volume holograms, each of which deflects only a portion of radiation coming from an object to be detected and impinging on the front side, such that the deflected portion propagates as coupled-in radiation in the base body as far as the output coupling region by means of reflection and impinges on the output coupling region. The volume holograms of the input coupling region can differ in that their deflection function comprises different spectral angular properties. As a result, different wavelengths can be deflected for the same angle of incidence. The output coupling region deflects at least one portion of the coupled-in radiation impinging on it, such that the deflected portion emerges from the base body (preferably via the front or rear side) in order to impinge on the detector system.

Such a waveguide enables more colors to be transmitted since the volume holograms of the input coupling region comprise different spectral angular properties and, consequently, for the same angles of incidence, deflect different wavelengths such that they are part of the coupled-in radiation in the base body.

The volume holograms of the input coupling region can be arranged adjacently (with or without a spacing between one another); in particular, they can be arranged adjacently in the first direction. However, it is also possible for the volume holograms of the input coupling region to be arranged one on top of another or one above another (that is to say preferably in a stacking direction that is transverse to the first direction and transverse to the second direction), such that as it were a layer stack of volume holograms is present. Alternatively or additionally, the functions of some or all volume holograms of the input coupling region can be implemented in a single volume hologram. Such an implementation is also called multiplexing. These possible configurations of the input coupling region can be provided in all of the exemplary embodiments described.

The output coupling region can comprise for each volume hologram of the input coupling region an assigned volume hologram, which provides the same spectral angular property during deflection as the corresponding volume hologram of the input coupling region. The dispersion of the volume holograms of the input coupling region can thus be compensated for.

The volume holograms of the output coupling region can be arranged adjacently (with or without a spacing between one another); in particular, they can be arranged adjacently in the first direction. However, it is also possible for the volume holograms of the output coupling region to be arranged one on top of another or one above another (that is to say preferably in a stacking direction that is transverse to the first direction and transverse to the second direction), such that as it were a layer stack of volume holograms is present. Alternatively or additionally, the functions of some or all volume holograms of the output coupling region can be implemented in a single volume hologram. Such an implementation is also called multiplexing. These possible configurations of the output coupling region can be provided in all of the exemplary embodiments described.

The volume holograms of the input coupling region can be embodied as reflective or transmissive volume holograms. The same applies to the volume holograms of the output coupling region.

The input coupling region can comprise at least or exactly 2, 3, 4, 5, 6, 7, 8, 9, 10, up to 40, up to 50 or up to 100 (or any value between 1 and 100) volume holograms.

In the case of the functionalized waveguide for a detector system, the input coupling region can comprise a plurality of diffractive input coupling structures, which are adjacent in the first direction and differ in that they comprise different horizontal fields of view in a plane spanned by a perpendicular to the front side and a second direction transverse to the first direction, such that they deflect radiation from the different horizontal fields of view toward the output coupling region.

A larger horizontal field of view can thus be captured and guided to a detector.

The diffractive input coupling structures can be embodied such that they deflect the radiation from the different horizontal fields of view toward the output coupling region.

A larger horizontal field of view can thus be captured and guided to a detector.

The diffractive input coupling structures can be embodied such that they encode the radiation from the different horizontal fields of view during the deflection by means of different deflected wavelengths, such that the output coupling and/or detection are/is possible selectively for the different horizontal fields of view.

The output coupling region can comprise for the diffractive input coupling structure an assigned diffractive output coupling structure, which selectively deflects radiation with wavelengths of the assigned diffractive input coupling structure.

The diffractive output coupling structures can deflect the radiation of the assigned input coupling structures such that said radiation impinges on locally different regions of a detector system.

A color filter can be provided for at least one locally different region of the detector, which guides only the corresponding wavelength range to the detector.

The diffractive input coupling structures can be embodied such that they encode the radiation from the different deflection angle ranges, such that the output coupling and/or detection are/is possible selectively for the different horizontal fields of view.

The input coupling region can comprise in front of each diffractive input coupling structure a shading stop with a lamellar structure, which defines for each diffractive input coupling structure a different vertical field of view in a plane spanned by a perpendicular to the front side and the first direction.

The output coupling region can comprise for each diffractive input coupling structure an assigned diffractive output coupling structure, which selectively deflects radiation from the different deflection angle ranges of the assigned diffractive input coupling structures. The diffractive output coupling structures can be arranged adjacently in the first direction.

The diffractive output coupling structures can be embodied in each case as a reflective or transmissive volume hologram.

The functionalized waveguide for a detector system can be embodied or developed such that the input coupling region comprises along the second direction at least two different diffractive input coupling structures which differ in that they comprise a different deflection component in the second direction.

There is thus a higher efficiency with regard to the utilization of the coupled-in radiation.

The deflection component in the second direction can be chosen for each of the diffractive input coupling structures, which are offset along the second direction with respect to the output coupling region, so as to compensate for the present offset for the coupled-in radiation.

The output coupling region can be embodied such that it defects the radiation coupled in by the different diffractive input coupling structures into the same angular range.

The functionalized waveguide for a detector system can be embodied or developed such that the input coupling region comprises an input coupling relief grating and the output coupling region comprises an output coupling relief grating.

In particular, the input coupling relief grating and the output coupling relief grating can comprise the same grating period.

The functionalized waveguide can also be embodied as a screen with a transparent base body. In this case, the transparent base body can be part of a screen.

The screen can be for example the screen of a portable device (such as e.g. a smartphone or a laptop), a stationary screen or some other screen, installed e.g. in a motor vehicle.

The output coupling region can be arranged closer to the edge of the base body than the input coupling region along the first direction.

Furthermore, the input coupling region can be arranged at the rear side.

Furthermore, the screen can comprise a light-emitting layer arranged on the rear side of the base body, and the input coupling region can be arranged between the base body and the light-emitting layer.

The image sensor can be arranged at the rear side of the base body in a region which serves as a displaying region of the screen and which is blanked during the recording by means of the image sensor.

The screen can comprise an additional camera, which records the object, wherein the recording effected by the camera is used for subsequently coloring a recording of the object by means of the image sensor.

The screen can comprise a light-emitting layer arranged on the rear side of the base body, which layer generates a real image. For this purpose, the light-emitting layer can comprise e.g. light-emitting pixels. In this case, the real image is generated in the plane of the pixels. The pixels can each comprise an emission angle of at least 50°, 60°, 70°, 80°, 90°, 100°, 110°, 120°, 130°, 140°, 150°, 160°, 170° to less than 180°.

Since this pixelated light-emitting layer is arranged on the rear side of the base body, the light emitted by the pixels is transmitted through the base body and reaches an observer.

In order to prevent light emitted by the light-emitting layer from being diffracted at the diffractive structure of the input coupling region and thus not reaching the observer, the diffractive structure of the input coupling region can be designed such that only light with a specific polarization is diffracted and thus guided in the base body (or waveguide). The light emitted by the light-emitting layer can then comprise an inefficient polarization for the diffractive structure of the input coupling region and be transmitted without disturbance by the diffractive structure of the input coupling region. Thus, the light-emitting layer no longer constitutes a source of stray light and it is no longer necessary to blank or omit the pixelated light-emitting layer in the region of the input coupling region in order to avoid the input coupling of stray light during the recording by means of the image sensor.

Possibilities for a defined polarization would be, inter alia, LCD displays or the application of a polarization film between the light-emitting layer and the base body.

The functionalized waveguide (or the detector system described) can be embodied or developed such that it is provided as a functionalized window (or as a detector system) for a vehicle. The vehicle can be a motor vehicle, a truck, an aircraft, a motorized or non-motorized vehicle or some other vehicle. The window can be an arbitrary window of the vehicle, such as e.g. the windshield, a side window or a rear window. In particular, a plurality of windows (or detector systems) for a vehicle can be provided. They can be used to detect e.g. the position of a person or of an object within the vehicle. Furthermore, a vehicle comprising one or a plurality of such functionalized windows (or comprising one or a plurality of detector systems) is provided.

The output coupling region can be arranged closer to the edge of the base body than the input coupling region along the first direction.

The window functionalized in this way can be used in a detector system (or detection system) which can be embodied and developed in the manner described. In particular, a detector can be provided, on which that portion of the radiation which is deflected by the output coupling region impinges. Between the output coupling region and the detector, the detection system can comprise at least one optically imaging element. The at least one optically imaging element can be embodied e.g. as a lens, as a refractive lens or as a refractive camera lens.

The base body can comprise a further input coupling region and a further output coupling region spaced apart therefrom in the first direction, wherein the further input coupling region deflects at least one portion of the radiation coming from a light or image source and impinging on the further input coupling region, such that the deflected portion propagates as coupled-in further radiation in the base body as far as the further output coupling region by means of reflections and impinges on the further output coupling region. The further output coupling region can comprise a structure, e.g. a diffractive structure, which deflects the coupled-in further radiation impinging on it, such that the deflected portion emerges from the base body through the front side or rear side in order to bring about the desired illumination and/or projection. The diffractive structure can be adapted to the wavelengths of the radiation coming from the light or image source such that as much radiation as possible is reflected. Nevertheless, the diffractive structure can still comprise the desired transparency upon viewing through it, for example. Furthermore, it is possible for the diffractive structure to deflect only a portion of the radiation from the light or image source.

The structure of the further output coupling region can be a transmissive or reflective diffractive structure, a transmissive or reflective volume hologram, a mirror surface, a prism or a transmissive or reflective relief grating.

A window comprising two additional optical functionalities is thus provided.

The coupled-in radiation and the coupled-in further radiation can for example propagate in opposite directions at least in sections in the same region in the base body. The same transmission channel is thus used in different directions.

Of course, the coupled-in radiation and the coupled-in further radiation can also propagate completely in different regions in the base body.

The input coupling region and the further output coupling region can be embodied at least partly in the same region in the base body. They can be embodied jointly in an integrated manner, for example, they can be embodied in a manner stacked one above another, and/or they can partly overlap.

Furthermore, it is possible for the input coupling region and the further output coupling region to be embodied in different regions in the base body.

Furthermore, the functionalized waveguide can be embodied or developed as a functionalized window for illumination and/or projection, wherein the base body comprises an input coupling region and an output coupling region spaced apart therefrom in a first direction. The input coupling region deflects at least one portion of the radiation coming from a light or image source and impinging on the input coupling region, such that the deflected portion propagates as coupled-in radiation in the base body as far as the output coupling region by means of reflection and impinges on the output coupling region. The output coupling region can comprise a structure, e.g. a diffractive structure, which deflects the coupled-in radiation impinging on it, such that the deflected portion emerges from the base body (preferably via the front side or rear side) in order to bring about the desired illumination and/or projection. The diffractive structure of the output coupling region is preferably partly transparent. The diffractive structure can be adapted to the wavelengths of the radiation coming from the light or image source such that as much radiation as possible is reflected. Nevertheless, the diffractive structure can still comprise the desired transparency upon viewing through it, for example. Furthermore, it is possible for the diffractive structure to deflect only a portion of the radiation from the light or image source.

The structure of the output coupling region can be a transmissive or reflective diffractive structure, a transmissive or reflective volume hologram, a mirror surface, a prism or a transmissive or reflective relief grating.

Furthermore, the first input coupling region for the detection can comprise a larger horizontal extent than the first output coupling region for the detection, and the second output coupling region for the projection and/or illumination can comprise a larger horizontal extent and larger vertical extent than the second input coupling region for the projection and/or illumination.

In this regard, a holographic strip for the detection (no pupil replication required) and a holographic surface for the projection and/or illumination can be situated in the upper, visible region of the transparent base body, wherein the holographic surface can generally comprise in the horizontal and vertical directions a larger extent for the positioning of the eyes than the second input coupling region in the non-visible region of the transparent base body.

The first input coupling region and the second output coupling region can lie in a visible region of the transparent base body (particularly if the functionalized waveguide is part of a detector system and illumination and/or projection system).

An illumination and/or projection system comprising a functionalized window for illumination and/or projection is furthermore provided. The illumination and/or projection system can furthermore comprise a light or image source.

The functionalized waveguide can be embodied or developed such that it is suitable not only for a detector system but also for an illumination and/or projection system. For this purpose, the base body can comprise a second output coupling region, which deflects at least one portion of the light from a light or image source that impinges on the second output coupling region as illumination radiation, such that the deflected portion serves for illumination and/or projection.

The second output coupling region can be embodied and developed in the same way as the output coupling region and respectively the first output coupling region described above.

The waveguide can be embodied such that the base body comprises a second input coupling region, which deflects the light from the light or image source such that the deflected light propagates in the base body as far as the second output coupling region by means of reflections and impinges on said second output coupling region.

Alternatively or additionally, the light from the light or image source can impinge as a free beam on the base body and, as a result, on the second output coupling region, such that it is not guided in the base body by means of reflection.

A detection system and illumination and/or projection system with a functionalized waveguide for a detector system and an illumination and/or projection system are furthermore provided. The system can comprise the light or image source.

The different embodiments described of the functionalized waveguide, of the functionalized screen and of the functionalized window can be combined with one another, insofar as is technically expedient. It is also possible for individual groups of features to be interchanged.

The detection system can be embodied as a camera (e.g. digital camera or video camera).

It is understood that the features mentioned above and the features still to be explained below can be used not only in the specified combinations but also in other combinations or on their own without departing from the scope of the present invention.

The invention will be explained in even more detail below on the basis of exemplary embodiments, with reference being made to the appended drawings, which likewise disclose features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times. In the figures:

BRIEF DESCRIPTION OF THE DRAWINGS

FIGS. 11A-F show side views of the input coupling region of the waveguide from FIG. 10;

FIG. 12 shows a schematic illustration of the spectrally resolved, angle-dependent deflection efficiency of the input coupling region in accordance with FIG. 10;

FIGS. 14A-F show schematic side views for elucidating the output coupling region of the waveguide in accordance with FIG. 10;

FIG. 15 shows a schematic illustration of the spectrally resolved, angle-dependent deflection efficiency for the input coupling region of a waveguide with 40 different volume holograms;

FIGS. 18A, 18B show side views of the input coupling region for elucidating the functioning of the waveguide in accordance with FIGS. 16 and 17;

FIGS. 19A-19C schematically show the angle-of-incidence-dependent and spectrally dependent efficiency of the mutually laterally offset input coupling volume holograms of the waveguide in accordance with FIG. 16;

FIGS. 43A-43C show one variant of the combination of the detection with the projection and/or illumination;

Figure 1:
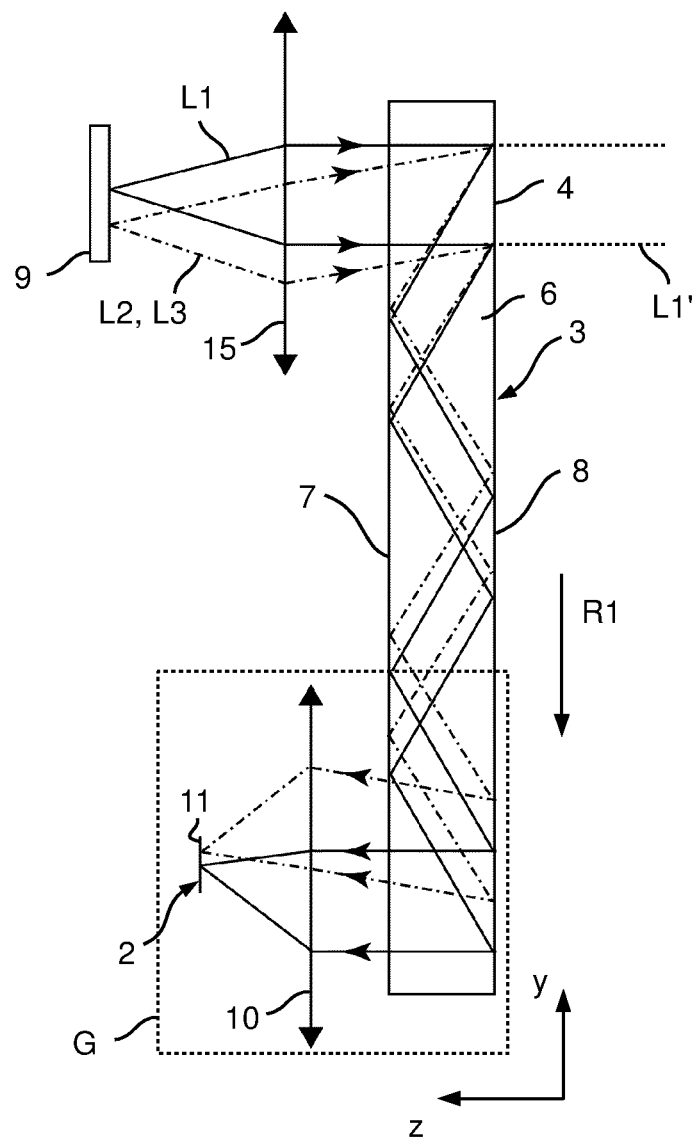
FIG. 1 shows a side view of one embodiment of the detector system.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 2:
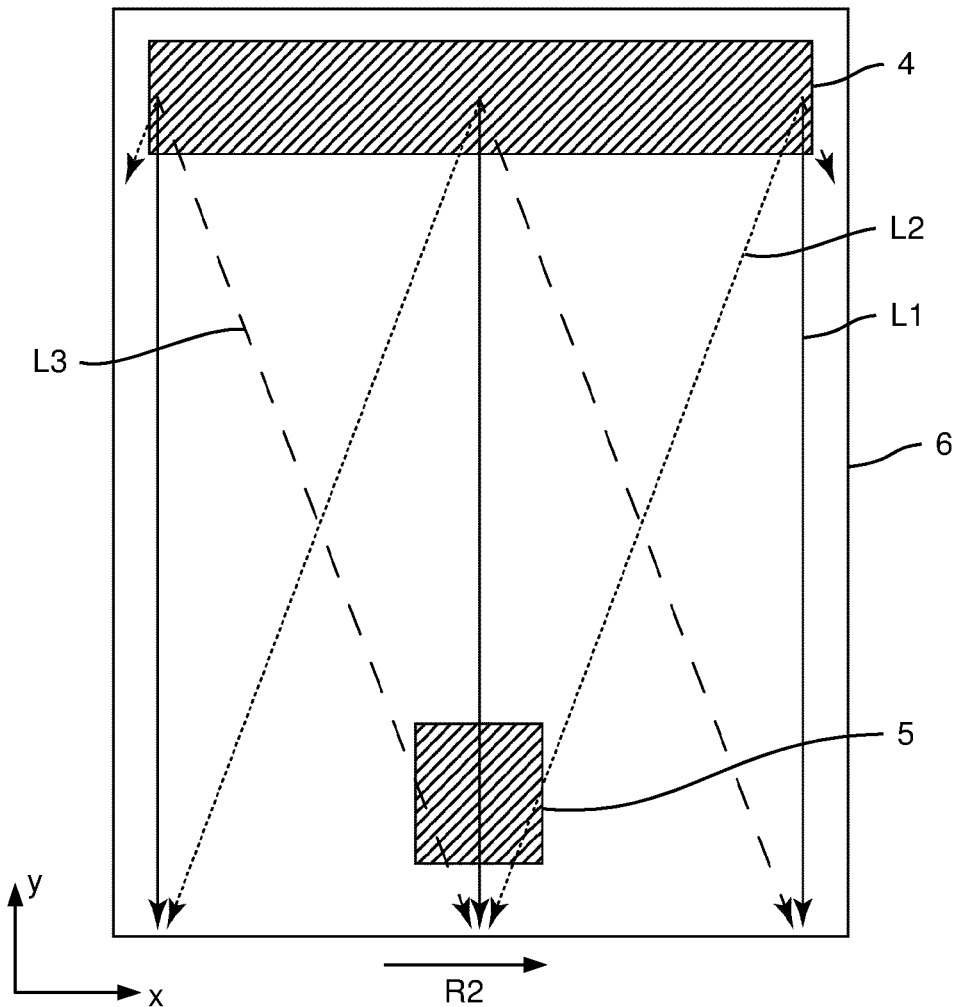
FIG. 2 shows a plan view of the waveguide 1 from FIG. 1.
Figure 3:
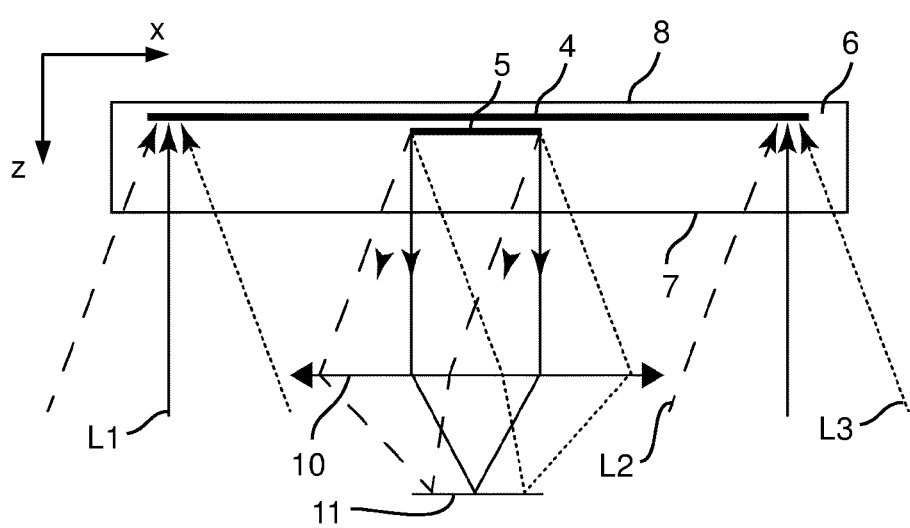
FIG. 3 shows a view from above of the waveguide 1.

The views in accordance with FIGS. 1 to 3 show an embodiment of the waveguide 1 according to the invention together with a detector system 2 in order to realize a camera 3.

For this purpose, the waveguide 1 comprises an input coupling region 4 and a output coupling region 5 spaced apart therefrom and, as is shown in FIGS. 1 to 3, can be embodied on a plane-parallel plate 6 having a plane front side 7 and a plane rear side 8. The plane-parallel plate 6, which can also be referred to as a base body 6, is formed from a transparent material, such as e.g. glass or plastic.

The detector system 2 and the lower part of the plate 6 with the output coupling region 5 can be arranged in a housing G, which is merely illustrated schematically in FIG. 1, such that at first glance it is not evident to a user that a camera 3 is involved.

By means of the camera 3, an object 9 can be imaged in such a way that light beams L1, L2, L3 emanating from the object 9 enter the plate 6 via the front side 7 and are deflected by the input coupling region 4 such that they impinge on the front side 7 at an angle such that total internal reflection takes place. The light beams L1, L2 and L3 are thus guided as far as the output coupling region 5 by means of total internal reflection at the front side 7 and rear side 8, said output coupling region bringing about a deflection in a direction toward the front side 7, such that the light beams L1-L3 emerge from the plate via the front side 7. The light beams L1-L3 thus propagate in the waveguide 1 along a first direction R1 (here y-direction) from the input coupling to the output coupling region 4, 5.

By means of a lens 10 of the detector system 2, the light beams L1-L3 are then focused onto a detector 11 of the detector system 2, such that the desired image of the object 9 can be recorded by means of the detector 11.

The input coupling region 4 is embodied as a reflective volume hologram comprising an angle-of-incidence-dependent wavelength selectivity, such that it has a high transparency for a large angular and wavelength range (as is indicated by the transmitted light beam L1' in FIG. 1; other transmitted light beams are not depicted, for the sake of simplifying the illustration). That means that only some of the light beams L1-L3 emanating from the object 9 and impinging on the input coupling region 4 are deflected in the manner described. Other light beams from the object 9 propagate through the input coupling region 4 and emerge from the plate 6 via the rear side 8. The input coupling region 4 can thus be designated as partly transparent.

Figure 4:
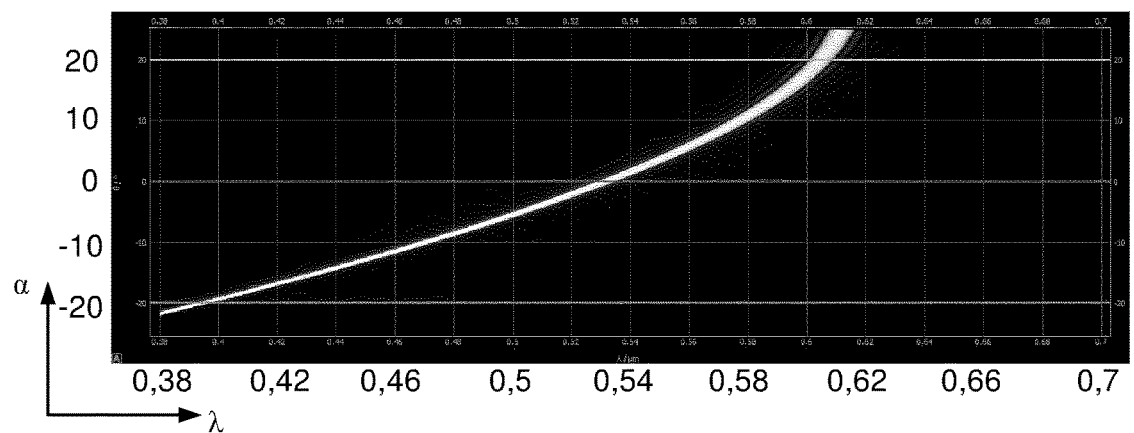
FIG. 4 shows a schematic illustration of the spectrally resolved, angle-dependent deflection efficiency of the reflective volume hologram of the input coupling region 4.
Figure 5:
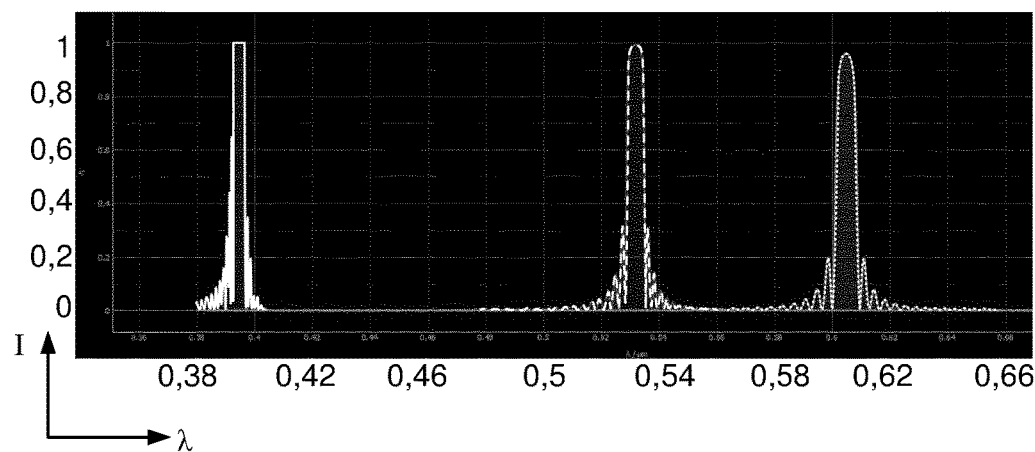
FIG. 5 shows a schematic illustration of the deflection efficiency for three different angles of incidence as a function of wavelength.

FIG. 4 schematically illustrates the spectrally resolved, angle-dependent deflection efficiency for the reflective volume hologram of the input coupling region 4 as a function of the angle of incidence of the corresponding light beam, wherein the wavelength in μm is plotted along the x-axis and the angle of incidence in ° is plotted along the y-axis. FIG. 5 illustrates the deflection efficiency for the angles of incidence +20°, 0° and −20°, wherein the wavelength in nm is plotted along the x-axis and the efficiency is plotted along the y-axis.

It can be gathered from FIGS. 4 and 5 that the reflective volume hologram of the input coupling region 4, for an angle of incidence of −20°, deflects radiation from the spectral range of 392 nm to 398 nm ($\lambda_{central}$=395 nm±3 nm) with high efficiency and thus couples it into the plane-parallel plate 6. For an angle of incidence of 0° the high efficiency is present for the spectral range of 528 nm to 536 nm ($\lambda_{central}$=532 nm±4 nm), and for the angle of incidence of +20° there is a high input coupling efficiency for the spectral range of 600 nm to 610 nm ($\lambda_{central}$=605 nm±5 nm).

Since the waveguide 1 in accordance with FIGS. 1 to 3 is embodied such that neither the input coupling region 4 nor the output coupling region 5 comprises an imaging function, an infinite-infinite configuration of the waveguide 1 is present. It can also be stated that the waveguide 1 carries out an infinite-infinite imaging. The spectral and angle-dependent deflection efficiency of the reflective volume hologram of the input coupling region 4 thus has the effect that each field angle (and thus each point of the imaged object 9), after input coupling by the input coupling region 4, consists only of a small spectral range, as has been explained with reference to FIGS. 4 and 5. This results in a spectrally resolved angular distribution which, on the detector 11, ultimately leads to an image with a spectral profile (or with a color profile). The light beams L1-L3 coupled out by means of the output coupling region 5 are thus coupled out with an angular spectrum which is converted into a location distribution on the detector 11 by means of the lens 10. The detector 11 can be e.g. a CCD detector or a CMOS detector.

Since the input coupling region 4 comprises the reflective volume hologram, the input coupling by means of the reflective volume hologram leads to dispersion within the coupled-in spectral range for each angle. If the output coupling region 5 comprises a reflective volume hologram embodied in the same way as that of the input coupling region 4, the dispersion caused by the input coupling region 4 is compensated for and all spectral components are deflected again into the corresponding angle.

As an alternative to the described infinite-infinite configuration of the waveguide 1, the input coupling region 4 and/or the output coupling region 5 can comprise e.g. an imaging function in the form of a lens element function or concave mirror function. As a result, finite-infinite, infinite-finite or finite-finite imaging configurations can be realized by means of the waveguide 1. In the case of the input coupling region 4, this can be used for example to record an object 9 which is positioned so near to the waveguide 1 that optically an object infinitely far away can no longer be assumed. In the case of the output coupling region 5, an implementation of such a lens element or concave mirror function makes it possible to convert the coupled-out angular spectrum directly into a location distribution in the focal plane of this implemented lens element or mirror function. In this case, the lens 9 can be omitted, for example. In this case, it can be stated that the detector system 2 comprises the detector 11 and also the lens element and/or concave mirror function of the output coupling region 5. Since the lens 10 can be omitted the detector 11 can be positioned and/or secured for example directly on the front side 7 of the waveguide 1, whereby a very high degree of integration, a minimum volume and high robustness can be realized.

Figure 6:
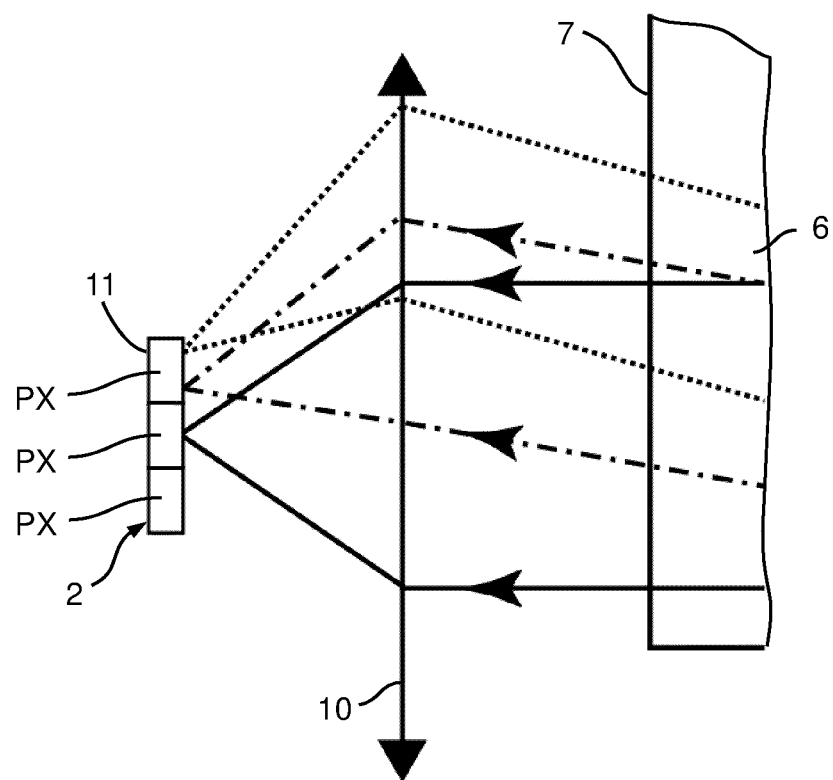
FIG. 6 shows an enlarged extract illustration of a side view for elucidating the averaging over a defined angular range that is effected by the detector pixels.

As has already been explained, the angular distribution that is spectrally resolved after the output coupling by means of the output coupling region 5 is converted into a location distribution on the detector 11 by means of the lens 10 or an imaging function integrated into the output coupling region 5. Such a detector 11 comprises a discretization in the form of pixels. In accordance with the illustration in FIG. 6, which illustrates the unfolded waveguide system on the detector side, each pixel PX averages here over a defined angular range given by the pixel size PG, the distance thereof from the optical axis $A_P$ and the focal length $F_{AK}$ of the lens 10 or of the imaging function of the output coupling region 5.

In accordance with the illustrations in FIGS. 4 and 5, the recording of an angular range is also associated with the integration over a spectral range. In this case, the spectral bandwidth is given by the maximum angle ($\alpha_2$, FIG. 4) and the minimum angle ($\alpha_1$, FIG. 4) recorded by a pixel, which angles can be calculated as follows:

$$\alpha_{1,n} = a\tan\left(\frac{PG \cdot 0.5 + (n-1) \cdot PG}{f}\right)$$

$$\alpha_{2,n} = a\tan\left(\frac{PG \cdot 0.5 + n \cdot PG}{f}\right),$$

$\alpha_{2,n} = a\tan(PG \cdot 0.5 + n \cdot PG/f)$ wherein n denotes the number of the respective pixel (0→on optical axis, n<0→below the optical axis, n>0→above the optical axis), PG denotes the pixel size and f denotes the focal length of the optical system.

With the aid of these limit angles, the bandwidth over which each pixel integrates can then be calculated on the basis of Kogelniks coupled-wave theory, for example. The total spectrum detected by a pixel is thus composed of the spectra within the detected angular range, thus resulting in the broadening in the illustrated spectra as shown in FIG. 5. For the limiting case where detector 11 consists of only one pixel, onto which all angular ranges are transmitted, image information with all spectral components would be recorded.

While the position of the pupil (beam-limiting stop or location at which the principle rays of all field angles intersect), in the case of the infinite-infinite configuration of the waveguide 1, is determined by the ratio of the width B1 (extent transversely to the first direction R1 along a second direction R2, which here corresponds to the x-direction) of the input coupling region 4 (FIG. 2) to the width B2 of the output coupling region 5, the field of view of the waveguide 1 in the direction R2 is additionally dependent on the distance D between the input coupling region 4 and the output coupling region 5 along the propagation direction R1 or the first direction R1 in the waveguide 1.

Of course, the dimensions of the input coupling region 4 and of the output coupling region 5 can be restricted by stops. The optically used dimension or optically used width is always assumed here. These are also referred to hereinafter as effective widths.

Figure 7A:
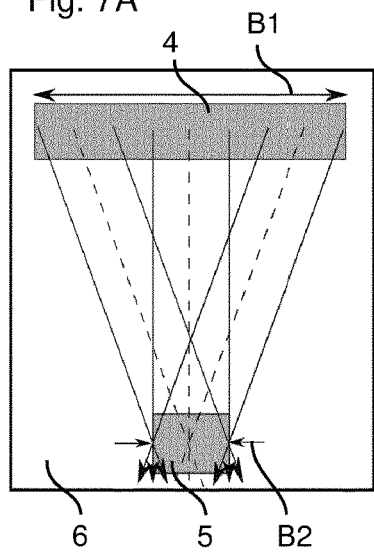
FIGS. 7A-7C show plan views of the waveguide for elucidating different width ratios between input coupling region and output coupling region.
Figure 7B:
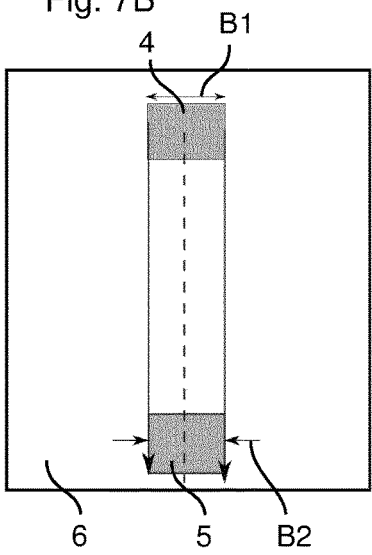
Figure 7C:
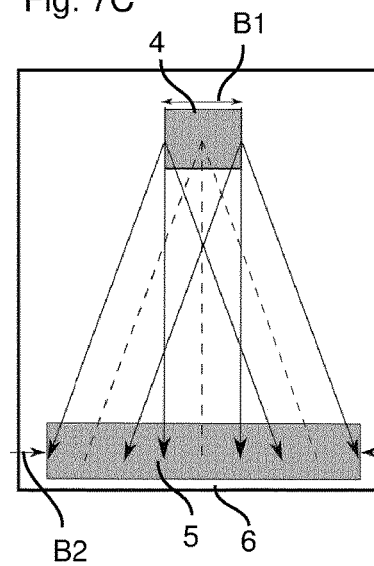

FIGS. 7A, 7B and 7C illustrate three fundamentally different width ratios of input coupling to output coupling region 4, 5. Only non-vignetted field angles are considered in the analysis of the pupil position.

FIG. 7A reveals that for the ratio B1/B2>1 the output coupling region 5 of the waveguide 1 acts as a pupil. All angles are thus present at each location of the output coupling region 5.

In the special case B1/B2=1 (FIG. 7B), only the central field angle propagates without vignetting through the waveguide 1. In this case, both the input coupling region 4 and the output coupling region 5 form the pupil.

In the case of a ratio of B1/B2<1 (FIG. 7C), the input coupling region 4 is the pupil of the waveguide 1, such that different angles ranges are present, and coupled out, at each location of the output coupling region 5.

Furthermore, in principle it is possible to draw a distinction between a field of view (also called FoV hereinafter) of the waveguide 1 and a field of view (also called FoV hereinafter) of the detector system 2. The smaller of the two fields of views (or of the two FoVs) here determines the field of view of the overall system.

The horizontal FoV (in the x-direction) captured by the waveguide 1 and coupled out again, in the case of the infinite-infinite configuration of the waveguide 1, is determined by the widths B1, B2 of the input coupling region 4 and of the output coupling region 5 and also the distance D between these regions (independently of whether the pupil lies on the input coupling region 4 and/or the output coupling region 5). The FoV of the detector system 2 is given to a first approximation by the focal length of the lens 10 (or of the lens element function contained in the output coupling region 5) and by the size of the detector 11 in the direction of the horizontal FoV.

Figure 7D:
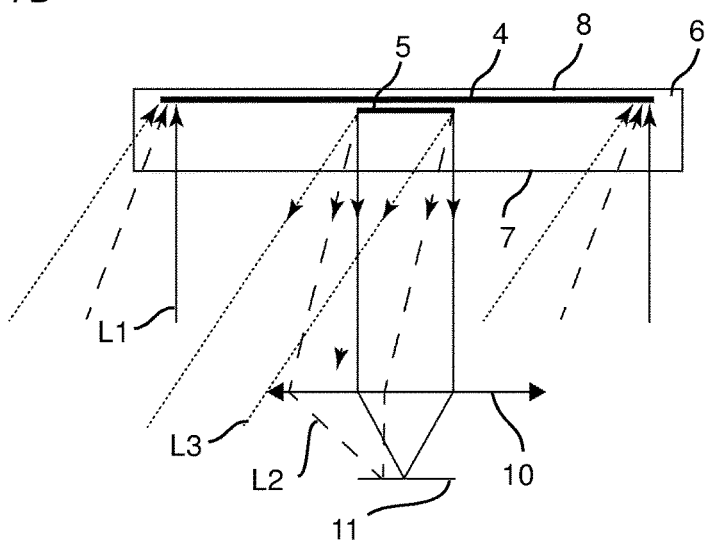
FIG. 7D shows a view from above for elucidating the possible restriction of the horizontal field of view in a detector system 2 with lens 1.

In the ideal case, the FoV of the waveguide 1 and of the detector system 2 is identical. This results in the optimum resolution over the entire FoV of the waveguide 1. As long as the FoV of the detector system 2 is larger than the FoV of the waveguide 1, the horizontal FoV of the overall system is given by the width of the input coupling region 4, the width of the output coupling region 5 and the distance D between input coupling region 4 and output coupling region 5. Advantageously, the entire FoV is thus captured. However, a reduced resolution is present. For the case where the horizontal FoV of the detector system 2 is smaller than the FoV of the waveguide 1, the FoV of the overall system is restricted by the FoV of the detector system. This results in the advantage of the increased resolution, with only a portion of the FoV of the waveguide 1 being captured. If the lens 10 is used, it can happen, under certain circumstances, that the distance between the detector system 2 and the waveguide 1 restricts the FoV since outer angular ranges can no longer be captured by the lens 10, as indicated in FIG. 7D.

A desired coordination of the FoV of the waveguide 1 with the FoV of the detector system 2 can be effected by adaptation of B1, B2 and D. A desired adaptation of the FoV of the detector system 2 to the FoV of the waveguide 1 can be effected by adaptation of the lens focal length and/or the size of the detector.

As has already been explained, the pupil position of the waveguide 1 is defined by the ratio of the width B1 of the input coupling region 4 to the width B2 of the output coupling region 5. The form of the angular distribution present at the output coupling region 5 consequently changes. This results in advantageous properties for specific arrangements and applications.

For the case where B1/B2>1, the output coupling region 5 forms the pupil of the waveguide 1. If all non-vignetted beams are considered, all field angles are thus present at each location of the output coupling region 5. Consequently, all field angles, i.e. the complete FoV of the waveguide 1, can be captured by means of only one detector system 2 with a sufficiently large FoV and as a sufficiently large entrance pupil. In order to achieve a large FoV of the waveguide 1, it is thus advantageous for the input coupling region 4 to be made wider than the output coupling region 5. Moreover, a small distance between input coupling region 4 and output coupling region 5 is advantageous.

Figure 8A:
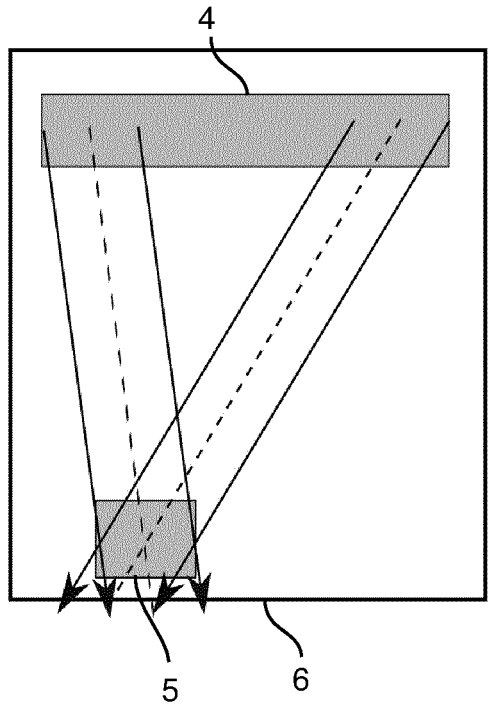
FIGS. 8A and 8B show further exemplary embodiments of the waveguide 1 according to the invention.
Figure 8B:
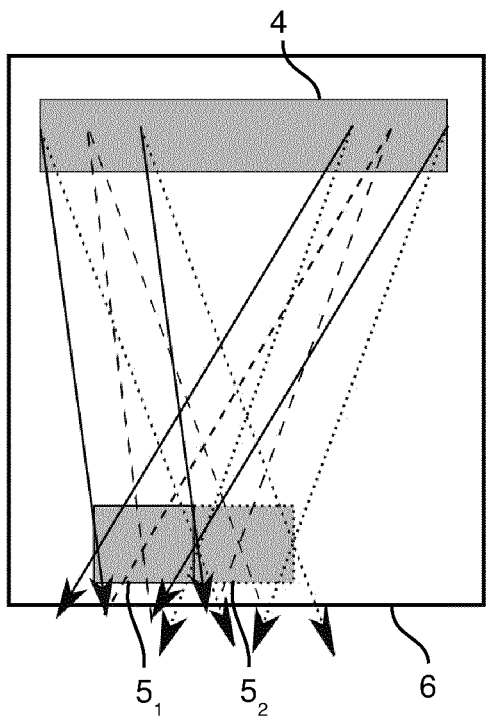

The illustration in accordance with FIG. 7A assumed that a horizontal symmetrical arrangement of input coupling region 4 and output coupling region 5 is present, thus resulting in a symmetrical FoV of the waveguide 1. It is possible, however, to offset the output coupling region 5 laterally (in the x-direction), as is indicated in FIG. 8A. This also results in an offset of the horizontal FoV. Without a corresponding correction of the output coupling region 5, this angular distribution with the corresponding offset as a result of the displacement is also produced in a displaced manner on the detector 11. This could have the consequence that the FoV of the detector system 2 is exceeded and the total FoV is thus restricted. This can be altered by implementing an additional deflection function (such as e.g. of a prism, of a tilted mirror, of a linear grating, etc.) in the output coupling region 5. Therefore, the offset of the coupled-out angular spectrum can be compensated for (or symmetrized) and the output coupling FoV can again be matched to the FoV of the detector system 2. Alternatively, it is also possible to tilt the detector system 2 according to the angular offset. If not just one displaced output coupling region 5 is provided, but rather a plurality of output coupling regions $5_1$, $5_2$ next to one another, including a corresponding compensation and adapted detection system 2, an enlarged horizontal FoV composed of a plurality of individual FoVs can be generated (FIG. 8B).

In the case of this configuration, it is true that it is possible to achieve the limiting case where the width of all the output coupling regions 5 together is equal to the width of the input coupling region 4. What is essential, however, is that each individual output coupling region 5 should be considered separately in relation to the input coupling region 4. As long as the width ratio is B1/B2>1 for each individual output coupling region 5, each output coupling region 5 remains the pupil of the system, and so the relationships described still hold true.

The relationships described on the basis of the example of the horizontal pupil position and the horizontal FoV can likewise be related to the vertical pupil position and the vertical FoV, wherein the folding of the beam path in this direction should be taken into account. In a vertical direction, however, the following special characteristics arise, wherein vignetted beams are also considered.

In the case of the infinite-infinite configuration of the waveguide 1, the vertical FoV captured by a hypothetical waveguide system of infinite extent and forwarded to the output coupling surface is given by the critical angle of total internal reflection within the waveguide 1 and the propagation angle of less than 90° relative to the perpendicular to the waveguide interface or the front side 7 and the rear side 8. For realistic waveguides 1 of finite extent, however, a propagation angle of less than 80° relative to the perpendicular to the front side 7 or the rear side 8 should be realized in order to ensure that beams L1-L3 from a large angular range propagate to the output coupling region 5 and not past the latter. For a customary refractive index of 1.5, an angular range of between 40° and 80° relative to the perpendicular to the front side 7 or rear side 8 thus propagates in the waveguide 1 and is coupled out again by the output coupling region 5.

Figure 8C:
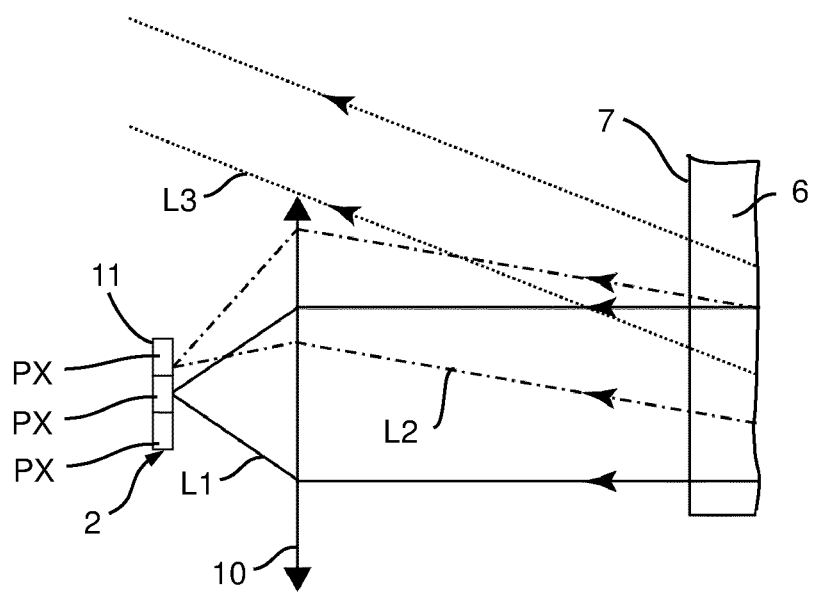
FIG. 8C shows an enlarged side view of the output coupling region of the waveguide 1 for elucidating a possible reduction of the vertical field of view.

Just like the horizontal FoV, the vertical FoV of the overall system (waveguide 1 together with the detector system 2) can also be restricted by the vertical FoV of the detector system 2. On account of the spectrally divided angular range coupled in and out again, the spectral sensitivity of the detector 11 can additionally have a restrictive effect on the vertical FoV. By way of example, if the detector 11 is not receptive to radiation of particularly long wavelength and/or short wavelength, the effective extent of the detector 11 decreases and thus so does the vertical FoV of the detector system 2 (FIG. 8C).

In the exemplary embodiments described, the image on the detector comprises the color profile described, such that a full color image cannot be forwarded and recorded by means of the waveguide 1.

Figure 9A:
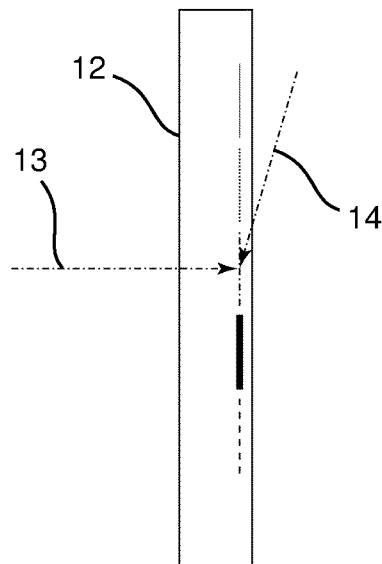
FIGS. 9A and 9B show an illustration for elucidating the production of a volume hologram for the input coupling region.

The described reflective volume holograms for the input coupling region 4 and the output coupling region 5 can be produced for example such that a photosensitive volume-holographic material 12 integrated into the waveguide 1 is exposed with a reference wave 13 having the wavelength of 532 nm, which is incident on the front side 7 at an angle of incidence of 0°, and a signal wave 14 having the same wavelength, which is incident on the rear side 8 at an angle of incidence of 60°, as is shown in FIG. 9A, wherein the reference wave 13 and the signal wave 14 originate from the same laser, such that an interference field or interference volume arises over the photosensitive volume-holographic material and corresponding refractive index modifications can form there.

Photosensitive glasses, dichromate gelatins or photopolymers can be used as photosensitive volume-holographic materials. They can e.g. be applied to a PC film (polycarbonate film) and be correspondingly exposed there. The film can then be laminated onto a substrate for the waveguide 1 in order to produce the waveguide 1. In this case, the film can be laminated for example only in the region of the input coupling region 4 and of the output coupling region 5. Alternatively, whole-area lamination over the entire waveguide surface is possible, wherein the corresponding input and output coupling function is exposed only into the input and output coupling regions. In order to protect the volume holograms, it is expedient to apply a further substrate to the laminated volume hologram. A layer stack having the following basic construction is thus realized: transparent substrate, cement or adhesive layer, volume hologram, cement or adhesive layer, transparent substrate.

Figure 9B:
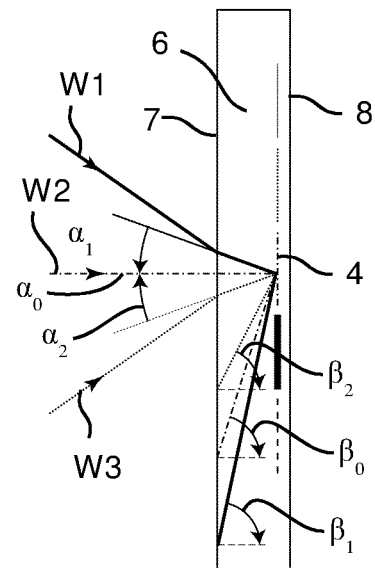
Figure 10:
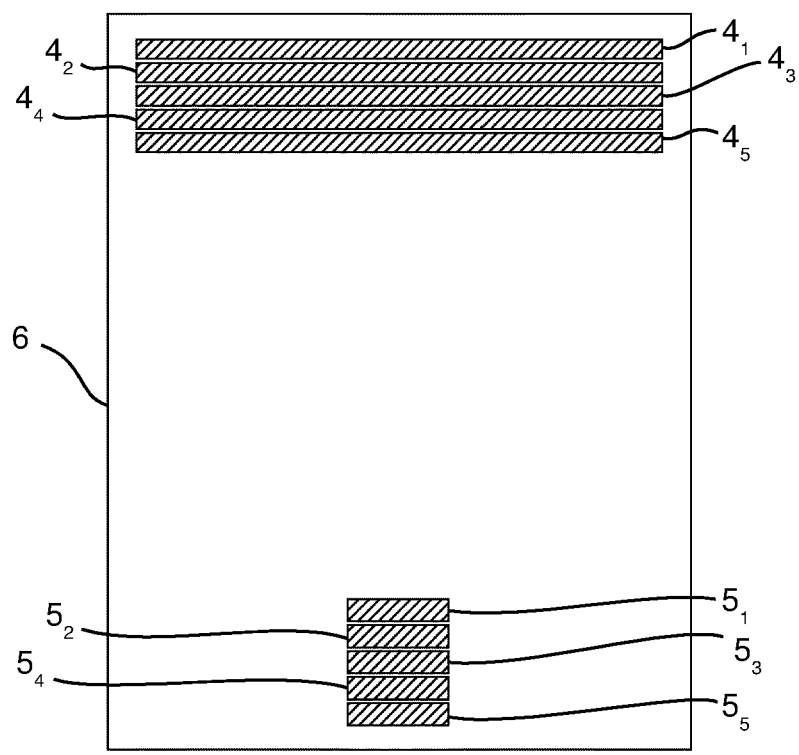
FIG. 10 shows a plan view of the waveguide in accordance with a further exemplary embodiment.

On account of the spectral angular dependence already described, from an incident plane wave W1 (FIG. 9B) that impinges on the reflective volume hologram in the material at an angle of +20°, the spectral range of 605 nm±5 nm is deflected toward the front side 7 such that the deflected wave W1 impinges on the front side 7 at an angle $\beta_1$ of approximately 40°. The reflective volume hologram of the input coupling region 4 is transparent to the remaining wavelengths of the plane wave W1.

In the case of a plane wave W2 that impinges on the reflective volume hologram at an angle of 0°, the wavelengths from the range of 532 nm±4 nm are reflected such that they impinge on the front side 7 at an angle $\beta_2$ of approximately 60°. The remaining wavelengths of the plane wave W2 pass through the reflective volume hologram, such that the reflective volume hologram is transparent to these wavelengths of the plane wave W2.

From a plane wave W3 that impinges on the reflective volume hologram in the material at an angle of −20°, the wavelengths of 395 nm±3 nm are reflected to the front side such that they impinge on the front side at an angle $\beta_3$ of approximately 80°. The remaining wavelengths of the plane wave W3 pass through the reflective volume hologram, such that the reflective volume hologram is transparent to these wavelengths.

In order to realize the transmission of angular information (image information from infinity) through the waveguide 1 in the largest possible spectral range, the angle-dependent spectrum shown in FIG. 4 can be improved by virtue of the input coupling region 4 comprising not just one reflective volume hologram, but rather a plurality of reflective volume holograms $4_1$, $4_2$, $4_3$, $4_4$ and $4_5$ arranged one below another, as is shown in FIG. 10 and FIGS. 11A-F. The volume holograms $4_1$-$4_5$ differ in that they comprise different spectral angular selectivities, as a result of which different wavelengths are reflected by the volume holograms $4_1$-$4_5$ for the same angle of incidence. On account of this angular selectivity, radiation that is coupled into the waveguide 1, e.g. by the volume hologram $4_1$ by means of reflection toward the front side 7 is not influenced (or is only slightly influenced) by the underlying holograms $4_2$-$4_5$, such that the coupled-in radiation can propagate to the output coupling region 5 (to the greatest possible extent) without being influenced.

The volume holograms $4_1$-$4_5$ can also be arranged one above another in the z-direction, thus giving rise to a layer stack on the waveguide. Furthermore, it is possible to implement the functions of all five holograms in one hologram (or volume hologram), also called multiplexing.

The different spectral angular properties can be achieved e.g. by using different wavelengths for the reference wave 12 and the signal wave 13 given the same angular setting as in FIG. 9A. Alternatively, it is possible to use identical wavelengths for all the volume holograms $4_1$-$4_5$, wherein the angle of incidence of the reference wave 12 and of the signal wave 13 is varied in a suitable manner.

The reflective volume holograms $4_1$-$4_5$ were recorded at different wavelengths with the exposure configuration in accordance with FIG. 9A. In this regard, the exposure wavelength was 900 nm (black) for the volume hologram $4_1$, 660 nm (red) for the volume hologram $4_2$, 532 nm (green) for the volume hologram $4_3$, 400 nm (blue) for the volume hologram $4_4$ and 370 nm (violet) for the volume hologram $4_5$.

FIGS. 11B-11F schematically illustrate the input coupling of the angular range through the minimum angle of −20°, the maximum angle of +20° and the central angle of incidence of 0° for each of the volume holograms $4_1$-$4_5$. At 0°, in this case, each reflective volume hologram $4_1$-$4_5$ respectively deflects and couples in the spectral range around the central wavelength with which the exposure of the respective reflective volume hologram $4_1$-$4_5$ was performed.

FIG. 12 shows, in the same way as in FIG. 4, the simulated total spectrum that is coupled into the waveguide 1 by the five reflective volume holograms $4_1$-$4_5$. Accordingly, each reflective volume hologram $4_1$-$4_5$ contributes with a different spectral range at each angle of incidence. If the totality of all the reflective volume holograms $4_1$-$4_5$ is considered, as a result the spectral bandwidth in the individual angles is increased and broadband image formation is ultimately ensured in total over all the angles of incidence.

Furthermore, the shift in the coupled-in spectrum in the direction of shorter wavelengths as the angle of incidence increases and the shift in the coupled-in spectrum in the direction of longer wavelengths for decreasing angles of incidence can be gathered from FIG. 12.

Figure 13A:
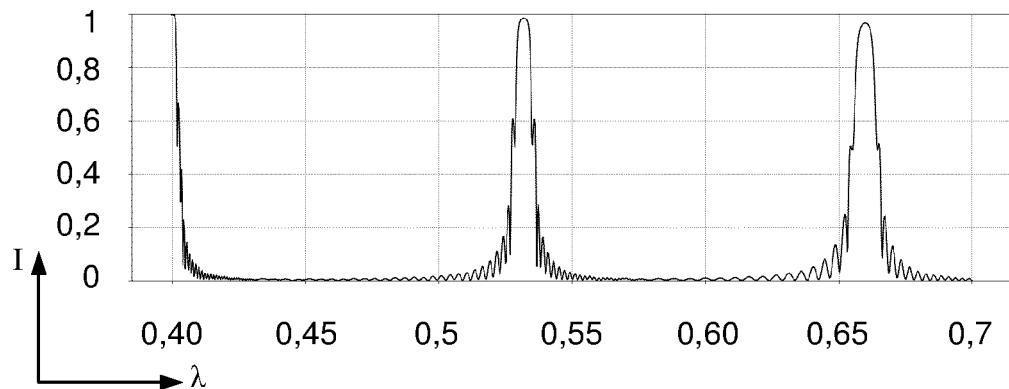
FIGS. 13A-13C schematically show the deflection efficiency of different angles of incidence as a function of wavelength.
Figure 13B:
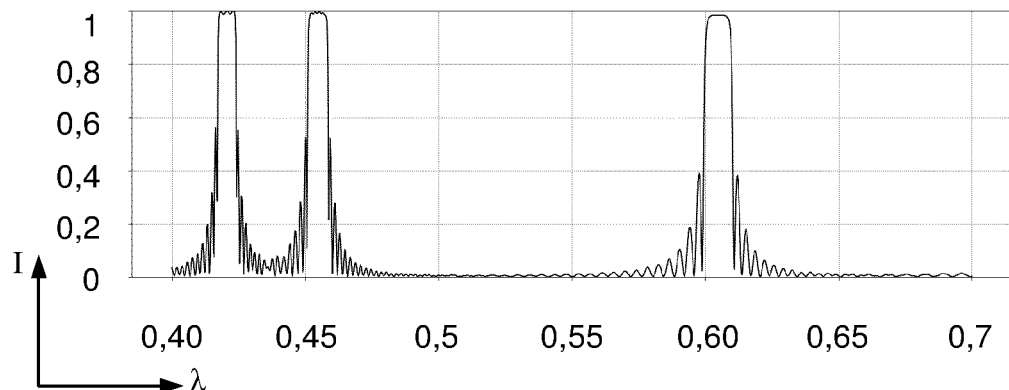
Figure 13C:
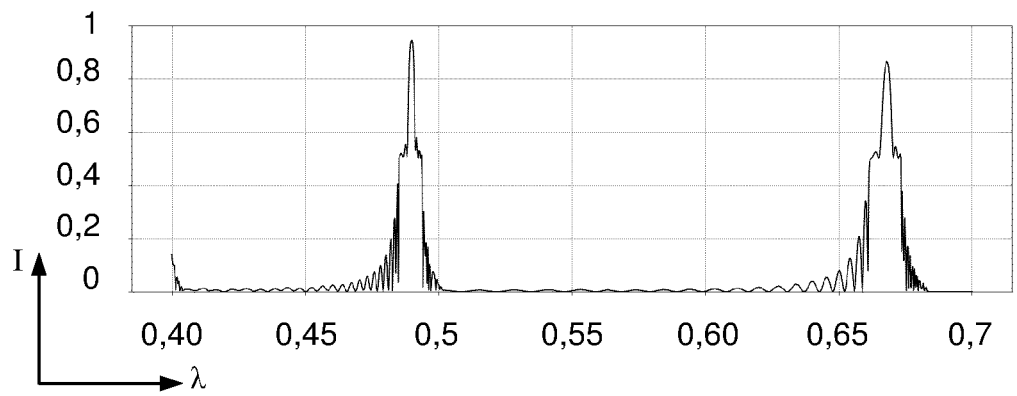

FIG. 13A shows by way of example the spectrum coupled in with the angle of incidence of 0°. FIG. 13B shows the corresponding spectrum for the angle of incidence of +20°, and the coupled-in spectrum for the angle of incidence of −20° is illustrated in FIG. 13C. In all of the illustrations in accordance with FIGS. 13A-13C, the wavelength in µm is represented along the x-axis and the input coupling efficiency in the range of 0 (no input coupling) to 1 (complete input coupling) is represented along the y-axis. A comparison with the illustration in accordance with FIG. 5 shows that in comparison with a single reflective volume hologram, there is significantly improved sampling of the coupled-in spectrum on account of the use of a higher number (five reflective volume holograms in comparison with one reflective volume hologram) of volume holograms recorded in a targeted manner.

FIG. 14 shows the corresponding reflective volume holograms $5_1$-$5_5$ for output coupling. The total height of the reflective volume holograms $5_1$-$5_5$ is preferably chosen to be similar to the entrance pupil 14 of the detector system 2 in order to be able to detect as much light as possible.

Just like in the case of the input coupling holograms, the volume holograms $5_1$-$5_5$ for output coupling can also be arranged one above another in the z-direction, thus giving rise to a layer stack on the waveguide. Furthermore, it is possible to implement the functions of all five holograms in one hologram or one volume hologram, also called multiplexing.

In order that a virtually continuous spectrum can be coupled into the waveguide 1 e.g. at every angle, thereby ensuring the forwarding of full color image information, e.g. forty reflective volume holograms exposed in a targeted manner can be arranged one above another. A corresponding simulation of the angle-dependent input coupling spectrum is illustrated in FIG. 15. The exposure wavelengths for recording the individual reflective volume holograms in accordance with the exposure configuration in FIG. 9A can be chosen as follows, for example, where the wavelength is indicated in nm in each case: 358, 368, 378, 389, 400, 411, 421, 432, 443, 454, 464, 474, 487, 498, 509, 519, 532, 544, 556, 568, 583, 598, 613, 629, 645, 662, 679, 696, 715, 735, 755, 775, 795, 815, 835, 855, 875, 896, 917 and 940.

Alternatively, the reflective volume holograms can also be recorded at one wavelength and with adapted exposure angles of the reference and signal waves 12, 13.

After the radiation has propagated in the waveguide 1 as far as the output coupling region 5, there are generally present there in a comparatively large area all angles and the complete spectrum at each location of this extensive output coupling region 5. The output coupling can then be carried out with corresponding reflective volume holograms, as described previously. The same forty volume holograms as are present in the input coupling region 4 are preferably generated.

However, since the output coupling region 5 often need not be transparent at all, any other type of output coupling of the radiation that has propagated as far as the output coupling region 5 is also possible. In this regard, it is possible to use a tilted mirror surface, a prism, reflectively coated gratings, transmission gratings and/or multi-order Fresnel structures in transmission or reflection. The use of nontransparent optical surfaces is possible at this point of the waveguide 1 since a nontransparent detector 11 is to be provided anyway.

This possibility for the embodiment of the output coupling region 5 also applies, of course, to the exemplary embodiments already described and to the exemplary embodiments yet to be described.

The tilted mirror surface and the multi-order Fresnel structure in reflection or transmission advantageously comprise a high efficiency and do not introduce additional dispersion during the deflection. However, they do not lead to dispersion compensation either. Reflectively coated gratings and transmission gratings for output coupling can carry out a desired dispersion correction. However, they comprise a lower efficiency. A prism comprises a high efficiency, but can disadvantageously amplify the dispersion. In the case of the embodiment of the reflective volume holograms, the desired dispersion correction is advantageously present since each wavelength channel is coupled out via a separate reflective volume hologram. However, a relatively low efficiency is present because the area of the output coupling region 5 has to be divided by the number of individual reflective volume holograms.

FIGS. 16 to 18B show an exemplary embodiment of the waveguide 1 in which the horizontal FoV (that is to say the FoV in the x-z-plane) is enlarged. It is assumed here that the FoV of the detector system 2 does not restrict the FoV of the waveguide 1.

Figure 17:
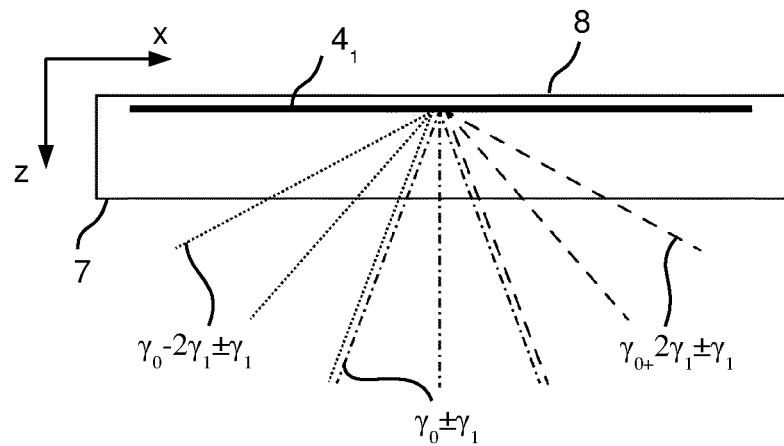
FIG. 17 shows a view from above of the waveguide from FIG. 16.

The input coupling region 4 comprises three reflective volume holograms $4_1$, $4_2$ and $4_3$ of identical width, which are arranged one above another (in the y-direction) and which cover different angular ranges and thus different horizontal fields of view in the x-z-plane, as is illustrated in particular in the view from above in FIG. 17 in the angle space.

As an alternative to the arrangement of the holograms $4_1$, $4_2$ and $4_3$ one above another in the y-direction, they can also be arranged one above another in the z-direction, thus giving rise to a layer stack on the waveguide. Furthermore, it is possible to implement the individual hologram functions of all three holograms in one hologram (or volume hologram), also called multiplexing.

In this regard, for example, the second reflective volume hologram $4_2$ can cover in the x-z-plane the angular range $\gamma_0 \pm \gamma_1$ and thus a central field of view for $\gamma_0=0$. In this case, the central field of view is given for example by the width of the second volume hologram $4_2$, the width of the correspondingly assigned second output coupling hologram $5_2$ and by the distance between the two volume holograms $4_2$, $5_2$.

In comparison with the second reflective volume hologram $4_2$, the first reflective volume hologram $4_1$ comprises an additional one-dimensional deflection function in the horizontal direction (in the x-z-plane). The horizontal field of view assigned to the first volume hologram $4_1$ is thus displaced by the absolute value of the impressed deflection function (angular offset) in the angular range and amounts to $\gamma_0-2\cdot\gamma_1\pm\gamma_1$. A corresponding impressed deflection function for the third reflective volume hologram $4_3$ results in a horizontal field of view of $\gamma_0+2\cdot\gamma_1\pm\gamma_1$. A different horizontal FoV can thus be transmitted by each volume hologram $4_1$-$4_3$ in combination with the corresponding volume hologram $5_1$-$5_3$ for the purposes of output coupling. With the aid of the absolute value and the direction of the respectively impressed deflection function (angular offset), the total FoV can be influenced in a targeted manner. In this regard, it is possible to produce for example symmetrical or else asymmetrical total FoVs and FoVs having overlapping partial FoVs or gaps between the partial FoVs.

In order to achieve the largest possible, symmetrical and gapless horizontal FoV in accordance with FIG. 17, the implemented deflection functions should be chosen in accordance with the specification in the preceding section in such a way that the angular ranges adjoin one another and overlap as little as possible.

Figure 16:
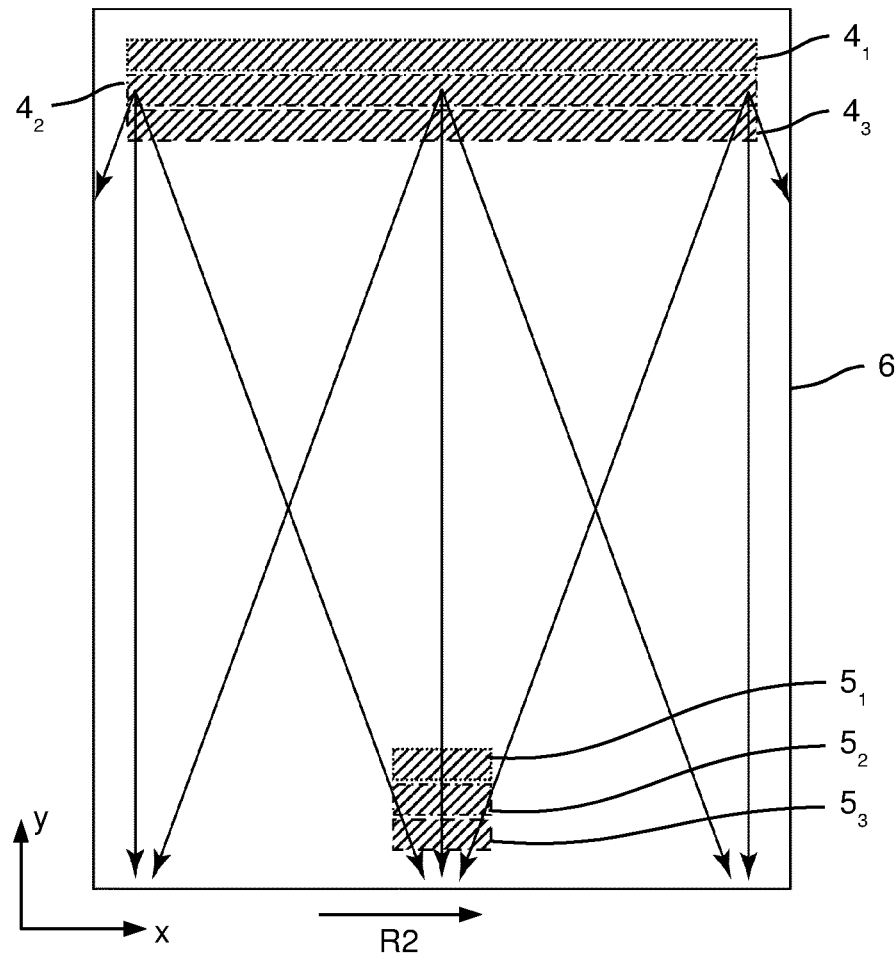
FIG. 16 shows a plan view of a waveguide according to the invention in accordance with a further exemplary embodiment.

In the case of the exemplary embodiment described here, all horizontal angular ranges propagate in the same horizontal channel after input coupling, as is indicated in FIG. 16. This is also necessary in order to ensure the detection by only one detection system 2. If all input coupling holograms $4_1$-$4_3$ are recorded identically apart from the deflection function, the superposition in the vertical direction also occurs, moreover, in accordance with FIG. 18A. After output coupling, therefore, all horizontal FoVs would be superimposed on the detector 11. In order to differentiate the individual horizontal angular ranges, the exemplary embodiment described here provides for encoding the horizontal angular ranges in a corresponding number of vertical angular ranges in accordance with FIG. 18B. In this case, care was taken here to ensure that the input coupling region 4 remains transparent for normal viewing through it in a large angular and wavelength range. The encoding of the horizontal angular ranges in vertical angular ranges can be effected such that the reflective volume holograms $4_1$ to $4_3$ are embodied such that they deflect into different vertical propagation angle ranges within the waveguide 1. The reflective volume holograms with corresponding deflection properties can be used for this purpose. Alternatively, a lamellar structure (webs)—not shown—for restricting the respective vertical FoV can be fitted in front of each reflective volume hologram $4_1$-$4_3$. However, the transparency in the input coupling region 4 is considerably restricted as a result.

With this differentiation of the different vertical propagation angle ranges, the radiation from each input coupling volume hologram $4_1$-$4_3$ and thus each horizontal FoV propagate in a different vertical FoV. After output coupling, the different vertical FoVs are then converted into mutually adjoining location distributions lying laterally one above another on the detector 11. A magnified horizontal FoV can thus be captured, the vertical FoV being reduced by the magnification factor of the horizontal FoV.

The detector-side spectral and angle-dependent separation of the horizontal FoVs encoded in the vertical FoV, said separation being explained in greater detail below, can be used in an alternative variant.

If each horizontal FoV is coupled in with an identically embodied volume hologram apart from the deflection function (angular offset), each horizontal FoV propagates in the same vertical angular range and spectral range through the waveguide 1. By way of example, the angle-of-incidence-dependent spectrum shown in FIG. 4 approximately results for each horizontal FoV. A detector-side separation is then no longer possible.

Alternatively, however, each horizontal FoV can be coupled in with a specific volume hologram in different directions in the waveguide 1, wherein each volume hologram $4_1$-$4_3$ was recorded in a different configuration (exposure angle and/or wavelength).

FIGS. 19A, 19B and 19C illustrate the angle-of-incidence-dependent and spectrally dependent efficiencies of the mutually laterally offset input coupling volume holograms $4_1$, $4_2$ and $4_3$ (FIG. 18B). The following consideration assumes that the angular range coupled in vertically is restricted to ±20° by total internal reflection in the waveguide. Furthermore, the detector 11 comprises only a spectral sensitivity of 400 nm to 700 nm. The procedure is also applicable, of course, to other vertical angular ranges and detector sensitivities.

In accordance with the illustration in FIG. 19B, the first volume hologram $4_1$ couples an angle of incidence range of between 6.67° and 20° in a spectral range of between 400 nm and 440 nm into the waveguide 1. In contrast to the first volume hologram $4_1$, the second volume hologram $4_2$ couples radiation from the entire angle of incidence range over a spectrum of 400 nm to 650 nm into the waveguide 1. The third volume hologram $4_3$ will couple the angle of incidence range of between −6.67° and −20° in a spectral range of 565 nm to 700 nm into the waveguide 1. Each horizontal field of view is thus coupled into the waveguide 1 by a specific volume hologram $4_1$-$4_3$ with different properties. These properties are used to separate the horizontal FoV after output coupling.

The holograms $4_1$, $4_2$ and $4_3$ can also be arranged one above another in the z-direction, thus giving rise to a layer stack on the waveguide. Furthermore, it is possible to implement the individual hologram functions of all three holograms in one hologram (or volume hologram), also called multiplexing.

In the output coupling region 5 it should be expected that the spectral angular spectrum coupled in by all the input coupling volume holograms $4_1$-$4_3$ is present at each location. In the output coupling region 5, volume holograms $5_1$, $5_2$, $5_3$ with a behavior identical to the vertical input coupling are arranged laterally offset one above another. Each of said holograms $5_1$-$5_3$ then provides for the output coupling of the radiation coupled in by the corresponding input coupling volume hologram $4_1$-$4_3$ with the spectral angular distribution illustrated in accordance with FIGS. 19A-19C.

Just like in the input coupling region, the holograms $5_1$, $5_2$, $5_3$ can alternatively be arranged one above another in the z-direction, thus giving rise to a layer stack on the waveguide. Furthermore, it is possible to implement the individual hologram functions of all three holograms in one hologram (or volume hologram), also called multiplexing.

After output coupling, the total field is separated, such that the different horizontal FoVs can be detected individually. For this purpose, firstly the detector area of the detector 11 is vertically divided. In this case, each area portion corresponds to a vertical angular range. In this case, the number of area portions (vertical angular ranges) is identical to the number of different horizontal FoVs. In the normal case, the detector area (vertical total angular range) is subdivided into area portions of equal sizes (a subdivision into area portions of different sizes is also possible). In accordance with FIG. 19C, however, spectral superposition occurs on account of the typical behavior in reflection volume holograms within the individual angular ranges, such that ultimately different horizontal FoVs would be superposed with identical vertical FoVs. In order to avoid this, spectral filters can be provided for each partial region of the detector 11, i.e. for each vertical partial angular range, which spectral filters realize a suppression of unintended spectral components for a corresponding angular range. Consequently, the different horizontal FoVs can be uniquely assigned to different regions on the detector (i.e. vertical angular ranges/FoVs). Consequently, the unique assignment of the different horizontal FoVs to different vertical FoVs is realized in accordance with FIG. 18b.

As an alternative to the use of spectral filters, it is also possible to use specific output coupling volume holograms that realize output coupling only in the required spectral range.

Figure 20:
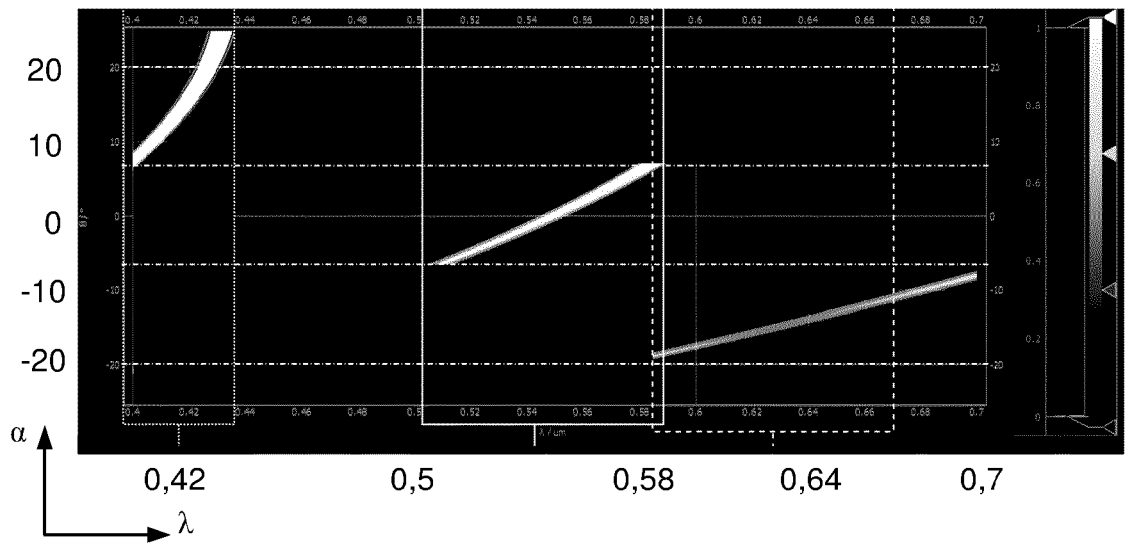
FIG. 20 schematically shows the spectral angle-dependent spectrum of the output coupling holograms of the embodiment in accordance with FIG. 16 including spectral filtering.

Following application of the spectral filters or upon use of the spectrally adapted output coupling volume holograms, the angle-dependent spectrum illustrated in FIG. 20 results. Superpositions of different horizontal FoVs therefore no longer occur and a unique assignment of the horizontal FoV to the corresponding vertical FoVs therefore occurs.

In this way, the detectable horizontal FoV is magnified. However, at the same time this leads to a reduction of the vertical FoV.

The advantage of the described spectral encoding of the horizontal FoV in the vertical FoV in comparison with the angular encoding of the horizontal FoV in the vertical FoV primarily consists in the higher transparency in a large angular and spectral range upon normal viewing through the input coupling region 4.

A disadvantage of the spectral encoding is that each horizontal FoV captures a different spectral band and information can be lost as a result if, for example, no or only little radiation in the corresponding spectral range occurs in a specific horizontal FoV. This deficiency can be compensated for by providing a plurality of output coupling regions with input coupling spectra correspondingly shifted spectrally for the different horizontal FoVs. However, a corresponding number of detector systems 2 is then required as well.

In the general design of the overall system of the waveguide 1 and the design of the input and output coupling volume holograms specifically, the following aspects should be taken into account:

The realization of n different horizontal FoVs requires n different input and output coupling volume holograms and also n angular ranges (detector regions) including corresponding bandpass or edge filter functions. n horizontal angular ranges are converted into n vertical angular ranges.

The individual efficiency profiles of the volume holograms must not comprise any spectral overlaps within the same angular range since otherwise spectral separation of the vertical FoVs and thus also of the horizontal FoVs is no longer possible. Superposition of radiation components of different horizontal FoVs would occur despite spectral filtering.

In order to capture as much radiation power as possible, each volume hologram should be designed such that the largest possible spectral range is covered in the angular range respectively covered. However, the spectral sensitivity of the detector should also be taken into account here. Comparison of the angular- and wavelength-dependent efficiency profiles in FIGS. 19B and 19C makes it clear that only a bandwidth of the radiation of 40 nm is used in the angular range of between +6.67° and +20°. A correspondingly optimized design of the volume hologram would make it possible to increase this bandwidth and thus to couple in a potentially higher radiation power. In contrast to the angular range of between +6.67° and +20°, in the angular range of between −6.67° and −20° a spectral range of 135 nm is coupled in.

The subdivision of the horizontal FoV is coupled to the spectral properties of the volume hologram. In the normal case, all vertical partial FoVs are of identical size. Depending on the application, however, different sizes of the vertical FoV can also be realized for the different horizontal FoVs. This requires a corresponding design of the volume holograms in combination with filtering upstream of the individual detector regions.

Figure 21:
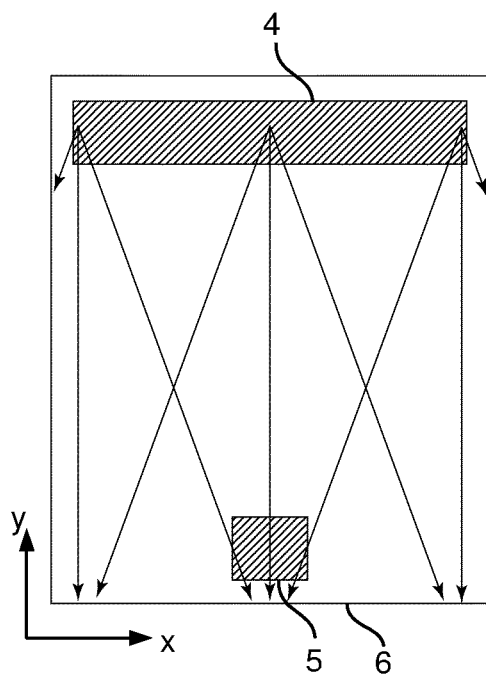
FIGS. 21 and 22 show plan views of two different waveguides 1 for elucidating a further exemplary embodiment.

FIG. 21 shows an exemplary embodiment of the waveguide 1 in which the input coupling region 4 is wider than the output coupling region 5 and the input coupling region 4 is realized by a reflective volume hologram. The output coupling region 5 can also comprise a reflective volume hologram. In this case, the FoV is given by the size of these areas and the distance between them. In the case of the exemplary embodiment described in association with FIG. 22, it is assumed that the FoV of the detector system 2 does not restrict the FoV of the waveguide 11.

Figure 22:
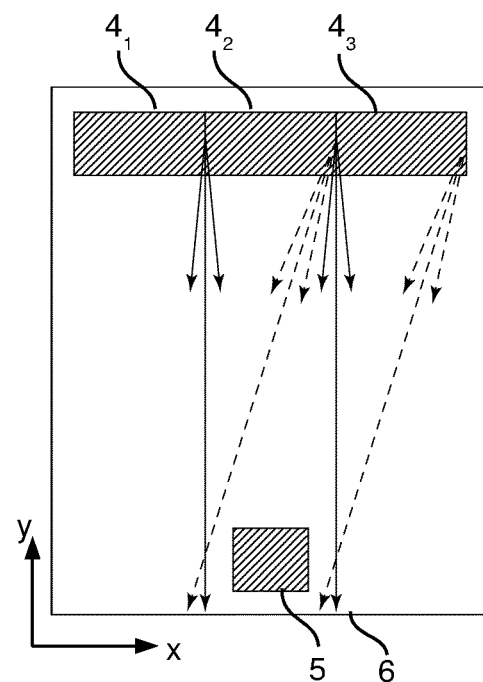

The approach in accordance with FIG. 22 for increasing the detection efficiency provides for subdividing the input coupling region 4 vertically (along the second direction) into three input coupling subareas $4_1$, $4_2$ and $4_3$. While the central input coupling area (or the central reflective volume hologram $4_2$ only includes a function for deflecting the radiation in the first direction (only in the y-direction without an x-component) to the output coupling region 5, a horizontal deflection function (or an x-component of the deflection) along the second direction (toward the central volume hologram $4_2$ is additionally integrated into the right-hand input coupling subarea $4_3$, as is indicated schematically in FIG. 22. A corresponding horizontal deflection function along the second direction (toward the central volume hologram $4_2$ is also integrated into the left-hand input coupling subarea $4_1$.

Without this deflection function, the FoV for the input coupling area $4_3$ and the output coupling region 5 would result from the sizes of the areas, the distance between them and also the decentration (along the second direction) of the input coupling $4_3$ with respect to the output coupling region 5 (the same would apply to the combination of the left-hand input coupling area $4_1$ and the output coupling region). This FoV has an angular offset relative to the central FoV (given by the central input coupling area $4_2$ and the output coupling area 5). In total, the result is an enlarged FoV given by the total width of the two input coupling areas.

The angular offset described can be compensated for by the integration of the described deflection function into the two lateral input coupling areas $4_1$ and $4_3$. The decentered input coupling volume hologram $4_1$, $4_3$ in combination with the output coupling volume hologram 5 then covers the same FoV as the central input coupling volume hologram $4_2$. However, the radiation emanating from the decentered input coupling volume hologram $4_1$, $4_3$ then propagates in the horizontal direction in the waveguide with a horizontal angular offset and is coupled out from the waveguide 1 with said offset. The same FoV is thus present next to one another after output coupling. These identical FoVs lying next to one another can be captured using a detector system 2 with a sufficiently large FoV. There is thus an increase in the detected radiation power for the horizontal FoV, but not the power density relevant to the signal-to-noise ratio.

In order to achieve this, the output coupling area 5 is configured with the aid of volume holograms in such a way that it couples out the radiation coupled in by the central input coupling volume hologram $4_2$ and the radiation coupled in by the decentered input coupling volume holograms $4_1$, $4_3$ into the same angular range.

This is achieved by virtue of the output coupling region 5 comprising different output coupling functions included in the exposure. In this case, each output coupling function is efficient only for the radiation of the corresponding input coupling volume hologram $4_1$-$4_3$ (angular selectivity of volume hologram), such that ultimately the radiation propagating to the output coupling region 5 from different directions is coupled out by the corresponding output coupling function into the identical angular range. The intensity of the angular selectivity can be set by way of the thickness and the refractive index modulation of the volume-holographic material and the exposure configuration.

One of these functions corresponds to the original output coupling function and provides only for the vertical output coupling of the radiation. All the other functions implemented comprise a specific, adapted angular selectivity, such that they are efficient only for a horizontal angular range around the respective horizontal angular offset, which propagate from the corresponding decentered input coupling area $4_1$, $4_3$ in the direction of the output coupling area 5. This output coupling function, in addition to the vertical output coupling function, includes a compensation of the horizontal angular offset, such that the FoV generated by the decentered input coupling areas $4_1$, $4_3$ is superposed with the FoV generated by the centered input coupling area $4_2$. Consequently, this results in the increase in the power density within the FoV and thus in the improvement of the signal-to-noise ratio.

The method described here can also be referred to in the optical sense as pupil reduction (cf. pupil replication or pupil expansion during imaging=opposite light path). In this way, power can be collected over a large area in the input coupling region 4 and can be coupled out over a small area in the output coupling region 5.

It is thus possible to realize an input coupling region 4 with a very low efficiency and thus high transmission. Therefore, this makes it possible for image information to be captured with high light intensity by way of an input coupling area 4 with the highest possible transmission. On the other hand, the input coupling region can for example be realized with just still acceptable transmission, i.e. with a high input coupling efficiency, in order to concentrate as much radiation power as possible on just a very small output coupling region. By way of example, a very small solar cell for converting the radiation energy into electrical energy could then be fitted at the output coupling region. It is also possible to carry out the output coupling to a detector array.

The implementation of different output coupling functions is possible with sufficiently thick volume-holographic material with sufficiently high refractive index magnification. This implementation of different functions in only one holographic area is also referred to as function multiplexing. Alternatively, the individual output coupling functions can also be exposed in a plurality of volume-holographic films stacked one above another.

It should be taken into account that just like in the vertical direction, in the horizontal direction, too, this is accompanied by angle-dependent, spectral input coupling and an angle-dependent spectral profile thus also occurs in the horizontal direction. However, since spectral information is lost anyway on account of the spectral distribution in the vertical direction, this color profile does not constitute a significant disadvantage of the method.

As is evident from FIG. 22, the increase in efficiency with vertical subdivision of the input coupling region 4, with the width of the input coupling region remaining constant, is associated with a reduction of the horizontal FoV, however. This disadvantage can be compensated for by a combination with the variant in accordance with FIGS. 16 to 18, although this results in a reduction of the vertical FoV.

By contrast, if the input coupling area from FIG. 21 is horizontally subdivided in accordance with FIG. 16, the original FoV of only one input coupling volume hologram (FIG. 21) can be enlarged. With the input coupling volume hologram area remaining constant, however, in total no increase in the coupled-in radiation power is achieved in this case. If the area of each input coupling volume hologram is enlarged, however, the efficiency of the system can be improved with the aid of the procedure described above.

In principle, the input coupling volume holograms can be distributed freely on the waveguide 1. It is then necessary to take account of the effect on the respective FoV with regard to the input coupling volume hologram and a correspondingly adapted correction of coupled-out angular ranges.

Figure 23:
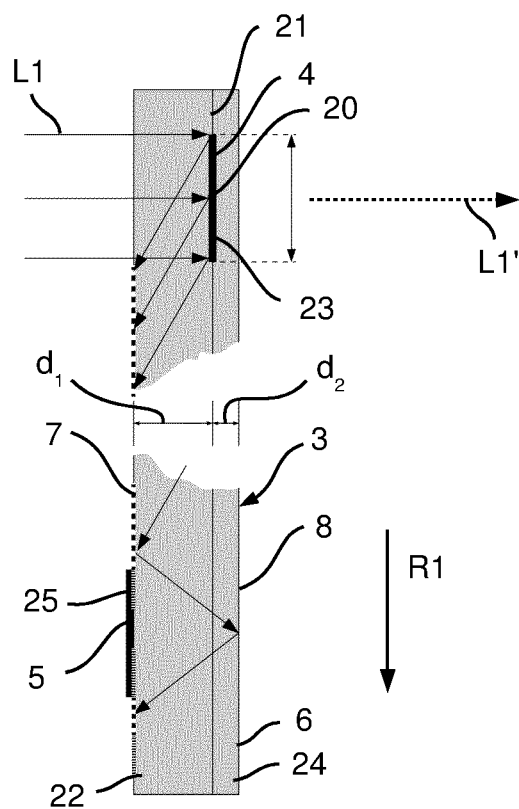
FIG. 23 shows a side view of a further embodiment of the waveguide according to the invention.

FIG. 23 shows an exemplary embodiment in which a relief grating is embodied both in the input coupling region 4 and in the output coupling region 5. The rules for defining the grating period are substantially the same as for a volume hologram. A diffraction angle is demanded which ensures total internal reflection in the waveguide 1. Furthermore, symmetrical gratings are advantageously used for input and output coupling. Furthermore, optionally, if desired, an imaging function can be applied to the input coupling rating and/or the output coupling grating. Therefore, even objects that are at a distance of e.g. only 50 cm from the waveguide 1 can be imaged sharply.

The advantage of the embodiment of the input and output coupling gratings as relief structures vis à vis volume holograms consists in the lower angular and wavelength selectivity. As already described, if volume holograms are used, an observation angle is linked with a restricted wavelength range. Without embodiment according to FIG. 11, gaps in the illuminating spectrum lead to dead vertical observation angles. These failures can be prevented by the higher wavelength and angular acceptance of relief structures.

The input coupling grating 20 can be molded by means of an epoxy resin or a UV-curing polymer, for example, onto the right-hand surface 21 of the left-hand plate 22 with the thickness $d_1$ in FIG. 23. In this case, typical polymers comprise refractive indices n of approximately 1.5.

The input coupling grating 20 is subsequently coated by means of a thin high refractive index dielectric layer 23. Typical refractive indices therefor are n>2.0. By way of example, values of between 10 and 100 nm can be used as thickness for the layer 23. In this case, it is advantageous in particular to coat not just the input coupling grating 20 but rather the entire left-hand plate 22 with the thin high refractive index layer 23 in order to achieve a uniform transmission impression over the entire area.

The second plate 24 (having a thickness $d_2$) is subsequently adhesively bonded onto the input coupling grating 20 and the associated plate 22 with the thickness $d_1$ by means of an epoxy resin or a UV-curing polymer. The input coupling relief grating 20 is thus buried in the substrate formed by the two plates 22 and 24 and, by virtue of its thin, high refractive layer, acts as a reflection grating 20 with diffraction efficiencies of between 5% and 20%.

For the output coupling grating 25, a grating having the same number of lines (grating period) is used, but it is molded onto the outer surface 7 of the left-hand plate 22 or onto the outer surface 8 of the second plate 24. In the case of the exemplary embodiment shown in FIG. 23, the output coupling grating 25 is molded onto the front side 7. Aluminum is vapor deposited on this grating 25 after molding in order to obtain a high output coupling efficiency. Efficiency values of around 50% are achievable here over a wide wavelength and angular spectrum.

The waveguide 1 with the input coupling grating 20 and the output coupling grating 25 has two stops since the edges of the input coupling grating 20 and the edges of the output coupling grating 25 each act as a stop, these stops trimming the beam path. The illustration in accordance with FIG. 23 illustrates only one beam for exactly one wavelength. Other wavelengths emanating from the same object point are deflected into other angles in the waveguide 1 by the input coupling grating 20. This relationship between wavelength and propagation angle in the waveguide 1 is continuous, albeit not linear.

Consequently, in the case of long waveguides 1 with many (e.g. 10, 20, etc.) reflections, there is the possibility of the area of the input coupling grating 20 (as viewed in vertical section) falling exactly on the output coupling grating 25. A large amount of light is then transmitted. However, it can also happen that the stop of the input coupling grating 20 is imaged just once below and once above the output coupling grating 25, such that no light is coupled out in the output coupling grating 25.

Figure 24:
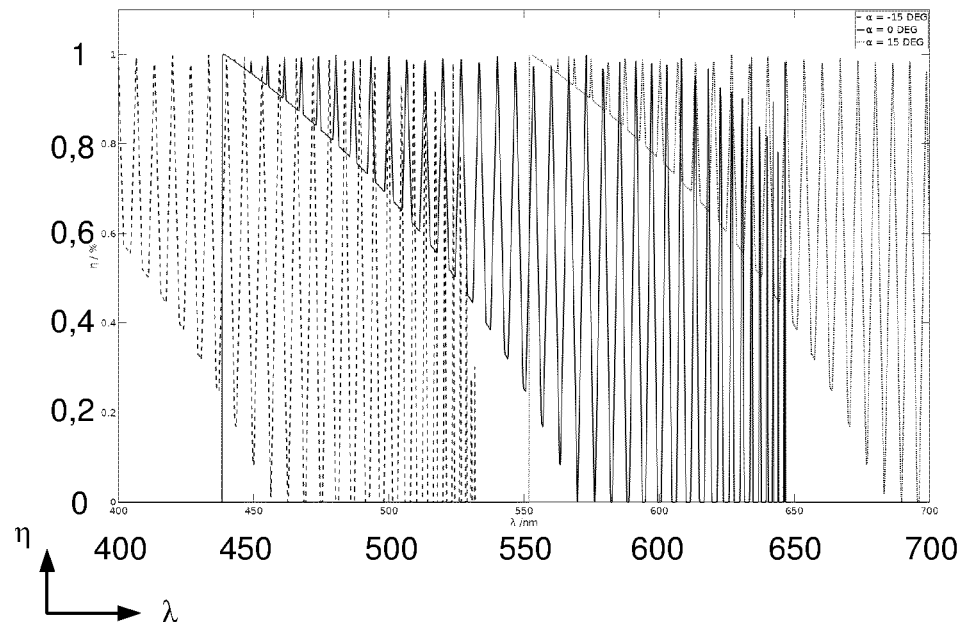
FIG. 24 shows a schematic illustration of the geometric transmission spectrum of the waveguide in accordance with FIG. 23.

As a result, the transmitted spectrum is divided into efficient and inefficient ranges that alternate almost periodically. Such a purely geometrically dictated transmission spectrum is illustrated in FIG. 24, wherein the wavelength in nm is plotted along the x-axis and the transmission efficiency between 0 (no transmission of the light incident on the input coupling grating 20) and 1 (the entire light incident on the input coupling grating 20 is coupled out via the output coupling grating 25, disregarding the grating diffraction efficiency) is plotted along the y-axis. Said transmission efficiency is illustrated for an angle of incidence of −15°, which covers the wavelength range of 400 to 530 nm (dashed line), for an angle of incidence of 0°, which covers a wavelength range of 440 to 645 nm (solid line), and for an angle of incidence of +15°, which covers a wavelength range of 555 nm to 690 nm (dotted line). In this case, the spectral limitations result firstly from the condition for total internal reflection and secondly from the deflection angle after input coupling at which the output coupling grating is still just impinged on (without total internal reflection at outer areas). It is evident from this that the transmitted spectral interval shifts with the angle of incidence. The transmitted spectral interval becomes larger as the refractive index of the waveguide 1 increases.

Figure 25:
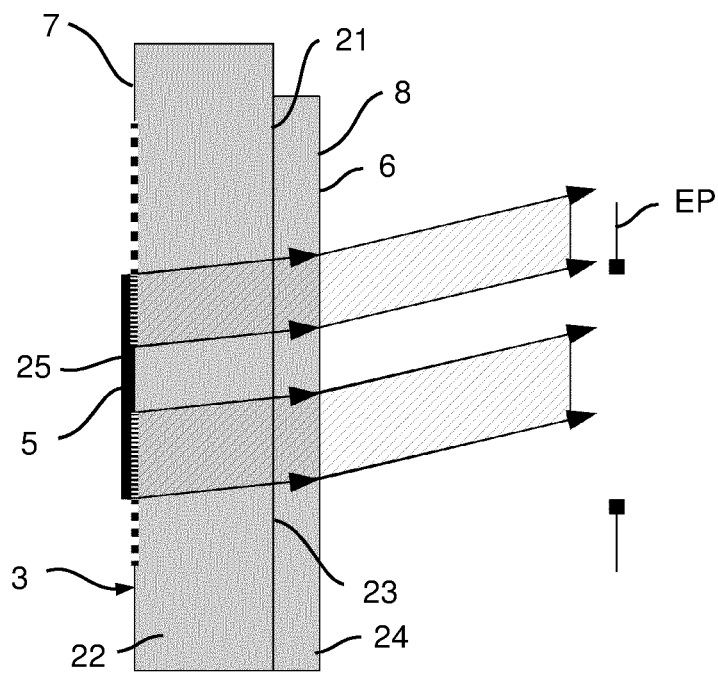
FIG. 25 shows an enlarged side view of the output coupling region of the waveguide from FIG. 23.
Figure 26:
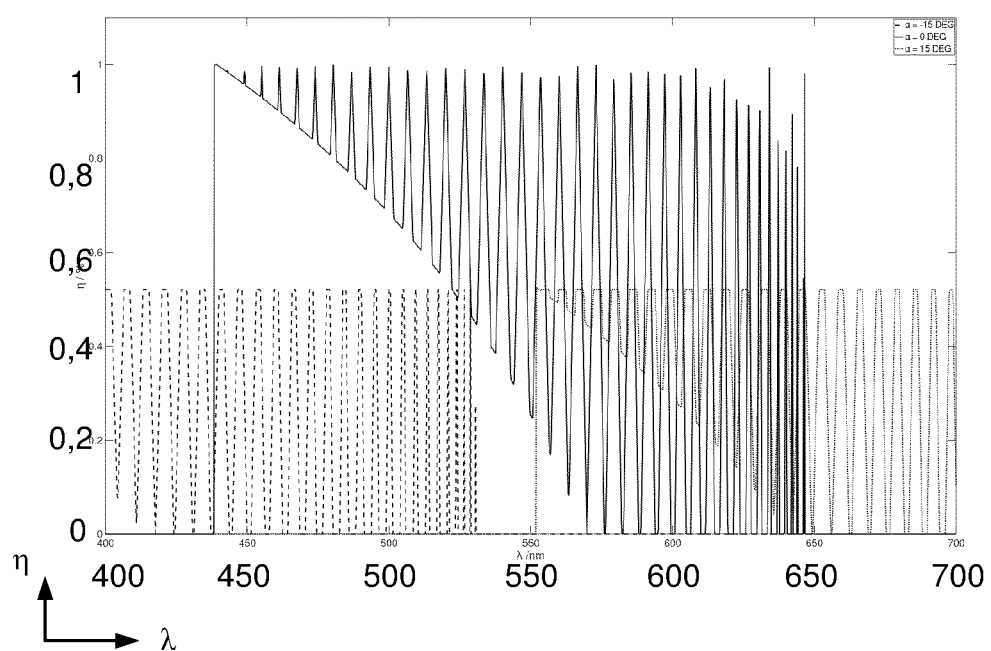
FIG. 26 shows a schematic illustration of the geometric transmission spectrum in the case of vignetting by the entrance pupil of the detector system.

FIG. 25 schematically illustrates the vignetting caused by the entrance pupil EP of the detector system 2. Consequently, a portion of the coupled-out rays may not impinge on the detector 11, which leads to a geometrically dictated transmission spectrum, as is illustrated schematically in FIG. 26. The illustration in FIG. 26 corresponds to the illustration in FIG. 24. As should be expected, this vignetting leads to poorer transmission spectra for the angles of incidence of −15° and +15°.

Figure 27:
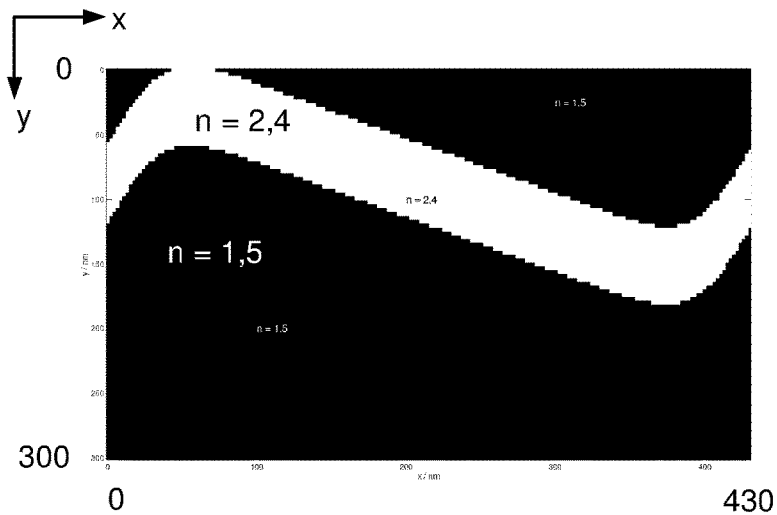
FIG. 27 schematically shows a simulated cross section through a grating period of the buried input coupling grating of the waveguide in accordance with FIG. 23.
Figure 28:
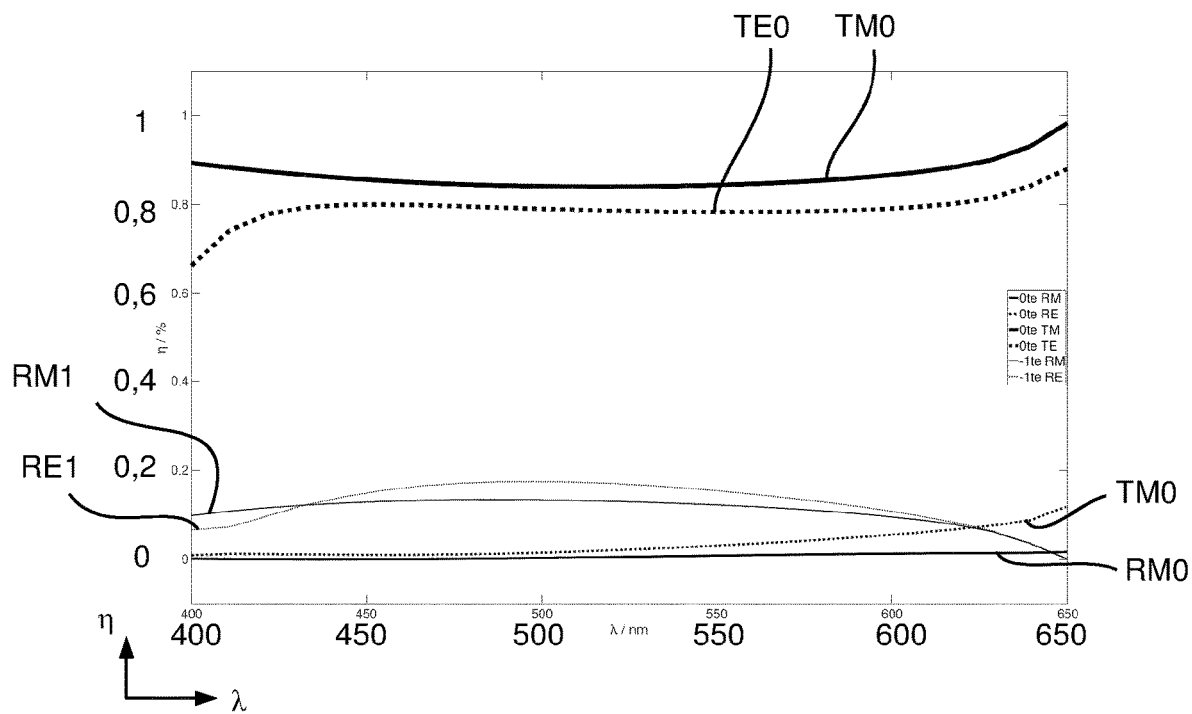
FIG. 28 schematically shows the diffraction efficiency of the relief grating as a function of wavelength.

The input coupling grating 20 can be configured as a sawtooth grating, that is to say that the profile shape of each grating period at least approximately follows a sawtooth shape. FIG. 27 shows a simulated cross section through a grating period of the buried input coupling grating, wherein a slight profile rounding was assumed for the grating. The lateral extent of 0 to 430 nm is plotted along the x-axis and the profile section in the range of 0 to 300 nm is plotted along the y-axis, thus resulting in a layer thickness of approximately 60 nm with a blaze depth of approximately 120 nm. Such a structure makes it possible to couple a wide wavelength range into the waveguide 1 with efficiency of approximately 10 to 15%. The resulting diffraction efficiency (reflectance) is plotted for the wavelength range of 400 to 650 nm (which is plotted along the x-axis) in FIG. 28. The curves RE0 and RM0 show the reflectance for the zero order reflection for the s-polarized field (RE) and the p-polarized field (RM). The curves RM1 and RE1 show the reflectance for the minus first order of diffraction for the s-polarized field (RE) and the p-polarized field (RM).

A profile shape similar to that in FIG. 27 can be used for the output coupling grating 25. A metal coating is used there, however, instead of the high reflective index dielectric.

Figure 29:
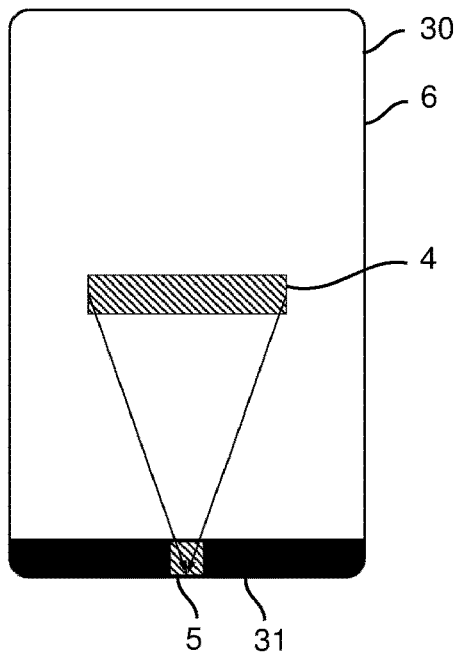
FIG. 29 shows the plan view of a further exemplary embodiment.
Figure 30:
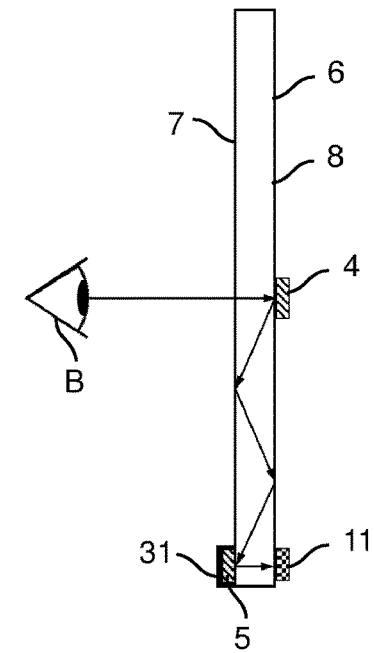
FIG. 30 shows a side view of the exemplary embodiment from FIG. 29.

FIGS. 29 and 30 show an exemplary embodiment in which the waveguide 1 is integrated in a display 30. The display 30 can be a display of a mobile consumer device (such as e.g. a cellular phone or a laptop). It can also be a display of a stationary computer.

As is evident in the illustrations in FIGS. 29 and 30, the input coupling region 4 with the reflective volume hologram is embodied on the rear side 8, said hologram bringing about a beam deflection such that the deflected rays are guided within the display by means of e.g. total internal reflection until they impinge on the output coupling region 5 with the output coupling volume hologram, which brings about a deflection in the direction toward the camera sensor 11. The image thus recorded is as it were a frontal view of the user B currently looking at the input coupling region 4. The image thus corresponds to a recording by a camera sensor positioned in the region of the input coupling region 4. Therefore, the solution in accordance with FIGS. 29 and 30 can be designated as a transparent image sensor that is integrated into the display, without the display function of the display being adversely affected. It is thus possible to effect recordings of images or image sequences in the location of the display 30 and a frontal view of the scene to be imaged is thus realized.

This property can advantageously be used e.g. for applications such as video telephony or the recording of self-portraits (so-called selfies), since the viewing direction of the user B toward the display coincides with the center of the image recorded by the camera. Therefore, during video telephony, for example, both parties to a call can more or less maintain eye contact, which has not been possible hitherto since the corresponding cameras have always been installed at the edge of the display. Said eye contact results in a more natural and more immersive conversation experience. When taking self-portraits, the user can e.g. track the live preview of the image to be recorded, without having to direct his/her gaze away from the camera and toward the display.

In addition to the deflecting function, e.g. the output coupling grating 5 can comprise an imaging function, such that an additional optical unit upstream of the camera sensor 11 is no longer necessary. The degree of integration of the camera into the display 30 can thus be maximized.

Owing to the diffraction efficiency having the pronounced wavelength and angular selectivity that is typical of volume holograms and owing to the possibility of setting the diffraction efficiency in a customized manner, that part of the display 30 which is covered by the input coupling grating appears transparent for the most part and the contents displayed on the display remain visible to the observer. To that end, on the one hand, the efficiency of the input coupling grating 4 must be high enough in order to enable image acquisition on the part of the camera sensor 11. On the other hand, the efficiency of the input coupling grating must be low enough that the transparency is maintained and disturbing effects for the observer do not occur. Therefore, the resulting transparency of the applied volume hologram in the input coupling region also depends on the light sensitivity of the camera sensor 11 used.

In the simplest construction of the input coupling region 4 and the output coupling region 5 in accordance with the embodiment in FIGS. 1 to 3, a different wavelength range is transmitted to the detector 11 or camera sensor 11 for each angle, thus giving rise to an image with a vertical color profile. Said image can subsequently be converted into a monochrome image. In order to obtain a natural multicolored image, for example, the monochrome image can be colored subsequently in real time with image information recorded by a further front camera. In this way, a natural image can be made available by way of the volume-holographically implemented camera function with the stated advantage of the frontal view.

Alternatively, the color functionality of the volume-holographically implemented camera function can be realized in accordance with the exemplary embodiment in FIGS. 10 to 15. The need for an additional front camera and subsequent coloring would thus be obviated.

The exemplary embodiment shown in FIGS. 29 and 30 assumed that the output coupling region 5 and also the camera sensor 11 lie below a non-displaying region 31 of the display 30, since otherwise the light emitted by the display would also fall on the camera sensor 11. This would disturb the recording of the image.

Figure 31:
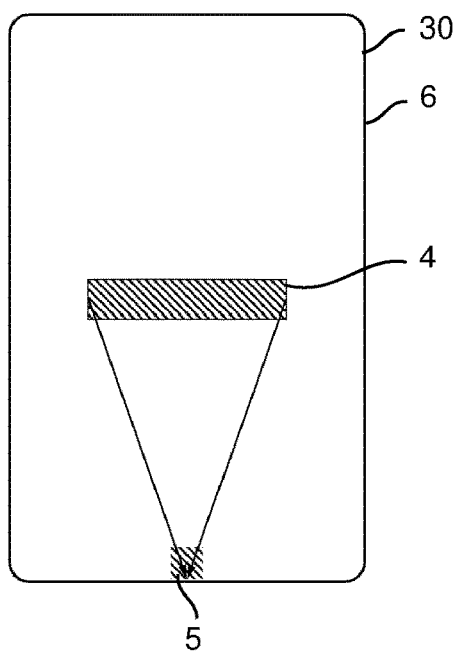
FIG. 31 shows a further exemplary embodiment.
Figure 32:
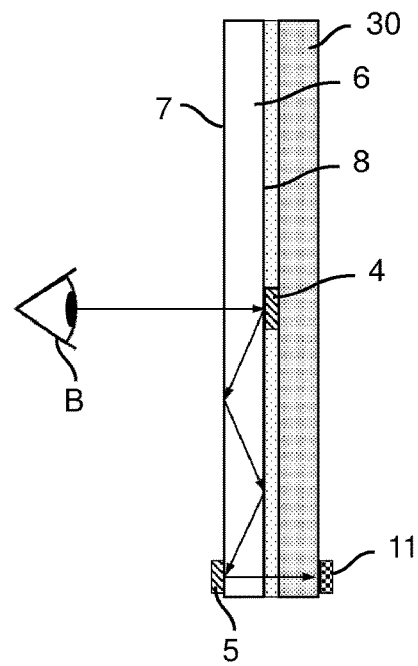
FIG. 32 shows the side view with respect to FIG. 31.

However, if a display 30 is used which is transparent in the case of inactivity, the camera sensor can also be arranged below the region actually used by the display, as is illustrated in the case of the exemplary embodiment in accordance with FIGS. 31 and 32.

During the recording of an image, the relevant region of the display 30 is then blanked, such that only the light coming from the output coupling region 5 falls on the camera sensor 11. In this way, the display 30 can be used completely for display purposes when the camera function is not activated. If the camera function is activated, then only a part of the display 30 is blanked. The display area is therefore restricted only as necessary, and moreover only in the vicinity of the edge.

In a large number of applications, considerable added value can be generated if additionally radiation can be introduced and/or radiation can be detected in the beam channels of an optical system, without significantly influencing the actual optical functionality of the optical system. In the case of radiation detection, radiation is reflected out of the beam path at a suitable point and directed onto a sensor. In the case where radiation is introduced into the system, the opposite light path is used and additional radiation components are introduced. That can be used for example for illuminating the object space or for introducing additional information.

Figure 33:
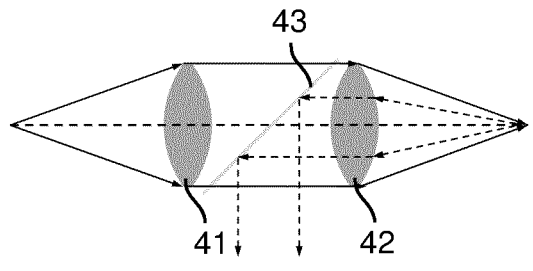
FIG. 33 shows a schematic illustration for an optical system.

In a known manner, partly reflectively coated substrates 40 are used for this purpose, as illustrated schematically in FIG. 33, wherein two lens elements $4_1$ and $4_2$ are depicted schematically for the optical system. This is the so-called combiner principle. However, this necessitates sufficient structural space in the optical system, said structural space being given by the size of the tilted substrate 40 or the projected beam diameter at the location of input and/or output reflection. Furthermore, introducing and also detecting radiation at the same location of the beam path is possible only with high outlay (special coatings, complex optics for radiation superposition).

Figure 34:
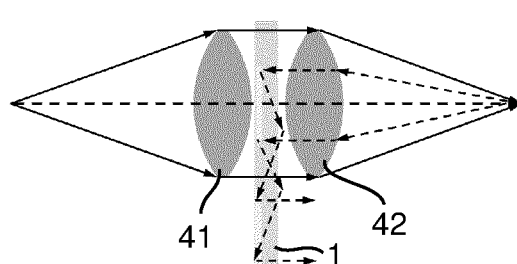
FIG. 34 shows the optical system in accordance with FIG. 33 with a waveguide according to the invention.

The waveguide 1 according to the invention as already described can be used in this case, too, said waveguide making it possible to introduce and/or detect radiation with minor requirements in respect of structure space, as is illustrated schematically in FIG. 34.

In addition to introducing and detecting radiation, the approach also affords the possibility, by means of filtering, of deliberately influencing the spectral properties of the radiation reflected in or out. Owing to the high transparency of the waveguide 1, these multifunctional components can be used at virtually any location of an optical system (if necessary even on the optical axis). Furthermore, the specific physical properties of volume holograms make it possible to implement these functions at virtually the same position.

The optical systems mentioned are understood to be technical optical systems but also transparent surfaces, such as e.g. windows, automobile windows, etc. In most cases, reflecting information in or out by way of a tilted, partly reflectively coated substrate does not constitute an acceptable solution. The principle of the waveguide 1 described makes it possible, however, to implement these functionalities directly in the transparent substrate (window, automobile windows, etc.) itself, without significantly influencing viewing through it, i.e. the original beam path. Consequently, this gives rise to totally novel applications for surfaces which in the normal case serve e.g. only to protect persons or objects against environmental influences such as wind, temperature, particles or radiation.

Figure 35:
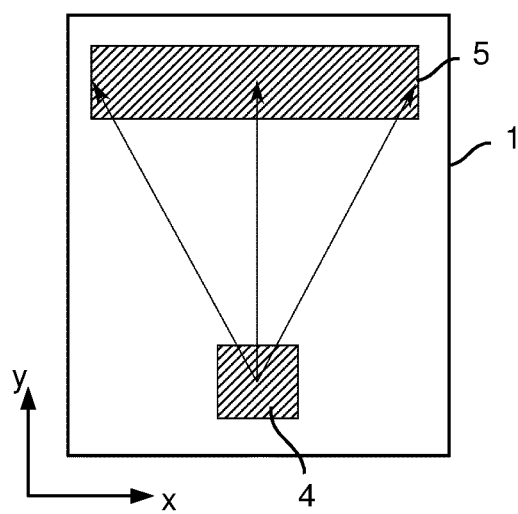
FIG. 35 shows a further exemplary embodiment of the waveguide according to the invention, which can be used in particular for projection and/or illumination.
Figure 36:
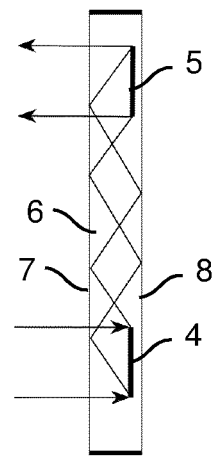
FIG. 36 shows the side view of the waveguide from FIG. 35.
Figure 37:
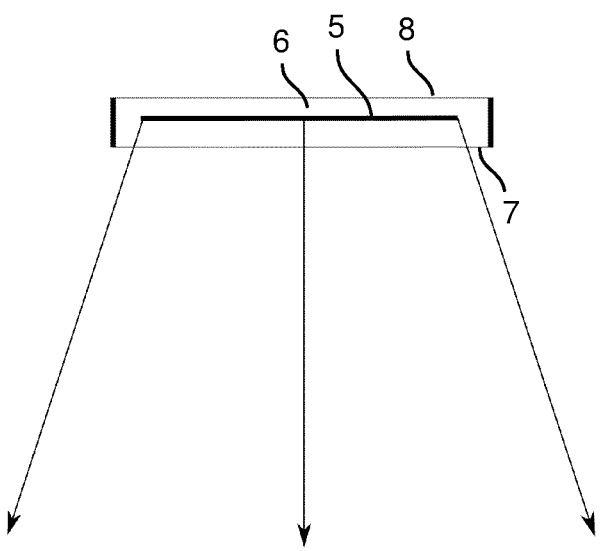
FIG. 37 shows the view from above of the waveguide from FIG. 35.

In this regard, the described principle of the waveguide 1 can also be used for illumination and/or projection. For this purpose, the light path in the waveguide 1 is used in the opposite direction and a static or dynamic light source (or a correspondingly luminous image source) is used instead of the detector. Consequently, the previous output coupling region becomes the input coupling region 4, and the previous input coupling region becomes the output coupling region 5, as is shown in FIGS. 35, 36 and 37. The radiation from the light source 32 is coupled into the waveguide 1 through the input coupling region 4 and is guided in said waveguide as far as the output coupling region 5, via which output coupling into the space or an optical system correspondingly disposed downstream is then effected.

Figure 38:
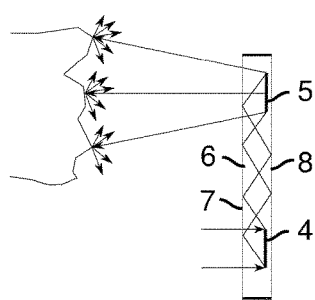
FIGS. 38-40 schematically show the illumination and/or projection with a waveguide.
Figure 39:
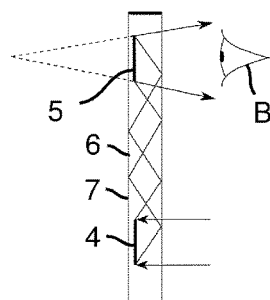
Figure 40:
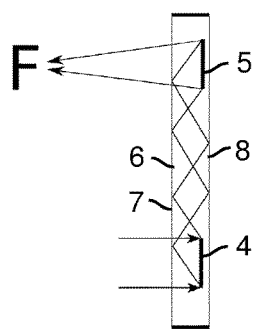

There are no fundamental differences between projection and illumination from a physical standpoint, since in both cases in general radiation is provided in a predefined form (angular and/or location distribution) in the space or in a beam path. The illumination of an object is illustrated schematically in FIG. 38. FIG. 39 schematically shows the projection of a virtual image for an observer B. FIG. 40 schematically shows the projection of a real image (here the letter F). The projection of a real image is identical to the illumination.

Since the input coupling region 4 and the output coupling region 5 can be realized with volume holograms (preferably reflective volume holograms), virtually transparent light sources or virtually transparent projection devices can be realized on account of the high angular and wavelength selectivity of the volume holograms. A high transfer efficiency from the input coupling to the output coupling, the generation of a defined emission characteristic (i.e. angular or location distribution) and desired spectral compositions can be realized in this case.

For the detection system, the extent of the input and output coupling areas 4, 5 in the horizontal direction can be adapted to the required FoV. In the vertical direction (or in the first direction), the size of the areas is given by the size of the aperture of the detection system. In order to achieve an extended FoV, an extent of the input coupling area 4 in the horizontal direction (or in the second direction) which is larger than the extent of the output coupling area 5 should preferably be chosen. An input coupling strip arises.

For a projection system, 2D pupil replication is preferred in order to make available the image information or illumination over an extended area (eyebox). In this case, the pupil that is coupled into the substrate is replicated in the horizontal and vertical directions. The output coupling area is thus an area whose extent in the horizontal and vertical directions differs from the extent of the input coupling area (which is a difference with respect to the detection system described above).

Upon connection of the detection and projection system, the input coupling region of the detection with the extents described above and the output coupling region of the projection with the extents described above are thus situated in the visible region of the waveguide.

Of course, in the case, too, of the waveguide 1 for the projection and/or illumination, optical imaging functions can be allocated to the input coupling and/or output coupling region 4, 5. Consequently, finite-infinite, infinite-finite, finite-finite or infinite-infinite configurations of the waveguide 1 can once again be realized. Therefore, during the input and/or output coupling it is possible to deliberately influence the radiation propagation and also the angular distribution and/or distribution in a defined location. In addition to or instead of optical imaging functions in the form of e.g. lens element and/or concave mirror functions, diffusor or beam transformation functions can also be introduced into the input coupling and/or output coupling areas, whereby it is likewise possible to deliberately influence the propagation of the radiation.

As in the case of the detection configuration, in the case of the illumination/projection configuration, too, the effective size in the input and output coupling areas 4, 5 has a considerable influence on the angular range transported, accepted and respectively emitted by the functionalized waveguide 1.

LEDs, lasers, etc. can be used as light source 32 and displays (e.g. DMD displays, LCD displays, etc.) can be used as image sources. Temporally variable angular or location distributions can be generated by the use of dynamic light sources or dynamic image sources. Therefore, adaptable illumination solutions can be realized in microscopes, for example, or else variable information (virtual or real image contents) can be introduced into beam paths.

Figure 41A:
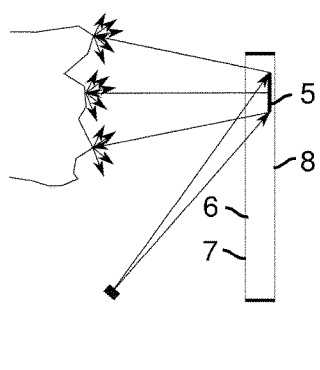
FIGS. 41A-41C show the illumination and/or projection comprising a free beam path from the light/illumination source as far as the output coupling region, wherein the output coupling region is used in reflective fashion.
Figure 41B:
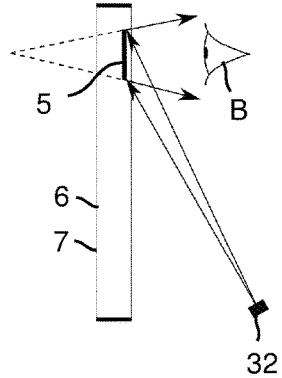
Figure 41C:
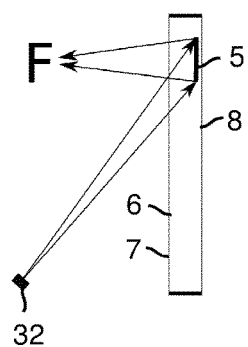
Figure 42A:
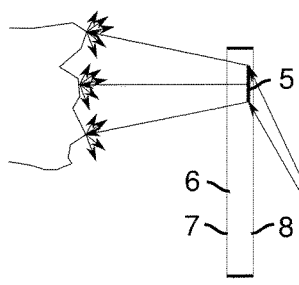
FIGS. 42A-42C show the corresponding arrangement in accordance with FIGS. 41A-41C if the output coupling region is used in transmissive fashion.
Figure 42B:
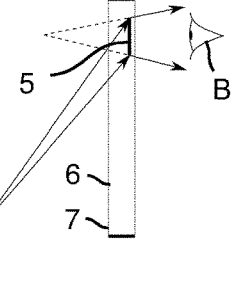
Figure 42C:
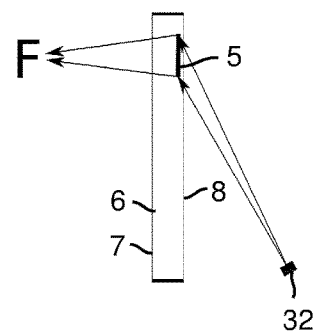

As an alternative to the waveguide-based solution, it is possible to realize illumination and/or projection functions with high transparency in a large angular and length range with normal viewing through also into a free beam set-up on the basis of reflection volume holograms in accordance with FIGS. 41A, 41B and 41C or on the basis of transmission volume holograms in accordance with FIGS. 42A, 42B and 42C.

As has already been explained a number of times, volume holograms exhibit an angle-dependent spectral sensitivity. Owing to this property, at a specific angle radiation within a defined wavelength range is still efficiently deflected and coupled into the waveguide 1, for example. While this effect is rather disadvantageous for general detection and illumination applications, it can also be used advantageously for spectral detection or illumination applications, for example.

In the field of illumination, this behavior of the volume hologram can be used to filter out a defined spectral range in the case of directionally incident radiation. In this regard, it is possible to realize narrowband light sources with partial coherence, for example, which in contrast to lasers are suitable in particular for the holographic projection of virtual or real image contents. In the case of convergent or divergent radiation, it is possible, with correspondingly recorded volume holograms, for the wavelength spectrum deflected by the volume hologram to be influenced by way of the angular distribution present at the volume hologram.

The angle-dependent spectral sensitivity of the volume hologram can be utilized for detection applications as well. In accordance with the simulated, angle-of-incidence-dependent and spectrally dependent efficiency in accordance with FIG. 4, for each angle of incidence a different spectral range is efficiently deflected and coupled into a waveguide 1 vertically, for example. In the simplest set-up of the camera, as is shown in FIGS. 1 to 3, an output coupling volume hologram 5 corresponding to the input coupling volume hologram 4 is used and provides for the output coupling of the angles propagating in the waveguide 1, wherein each angle consists of a defined spectral range as a result of the filtering or input coupling. The angular distribution is subsequently converted into a location distribution on the detector 11 by means of an imaging function in the output coupling volume hologram 5 or by means of a lens, wherein each location in the vertical direction then corresponds to a defined spectral range. By means of an angular scan in the vertical direction and a synchronous detection of the intensity on the detector 11, angle-dependent spectral information can be determined in a parallelized manner in the horizontal direction.

Such a system can be fitted to the underside of an aircraft, for example. Through knowledge of the detection system 2, the flying speed and the position of the aircraft, spectral information about the overflown region can be determined, wherein the data are recorded horizontally in a parallelized manner.

The exemplary embodiments described above have presented possibilities for functionalizing transparent surfaces, wherein a high transparency of said surfaces can be maintained in a large angular and wavelength range during normal viewing through them. In this case, the radiation in the transparent region, by means of specific volume holograms 4, is coupled into the waveguide 1 in the case of detection and out of the waveguide 1 in the case of illumination/projection. The propagation between this transparent detection and/or emission area is effected on the basis of total internal reflection within the substrate or the waveguide. However, a reflection is also possible on the basis of a suitable reflective coating. The optoelectronics (detectors and control sources) can then be introduced at an advantageous position in terms of design or function. Consequently, the position of the radiation detection and/or radiation emission is no longer tied to the position of the optoelectronics.

The high transparency of the volume-holographically introduced functions described allows these functions to be realized virtually at the same location, since, given a suitable design of the volume holograms, the functions do not influence one another, or only slightly influence one another.

This can be realized in practice e.g. by the volume holograms in which the individual functions are implemented being applied one above another (as a stack). Alternatively (with sufficiently large maximum refractive index modification of the volume-holographic material) a plurality of optical functions can also be exposed into a volume hologram. The transparency of the functionalized waveguide 1 is maintained here given a suitable design of the volume holograms 4, 5. In combination with the waveguide-based beam transport and the small design associated therewith, firstly it is possible to realize highly functionalized, transparent surfaces such as e.g. windows. Secondly, the approach allows the functionality of optical systems to be considerably extended by means of a comparatively small intervention in the beam path.

Figure 43A:
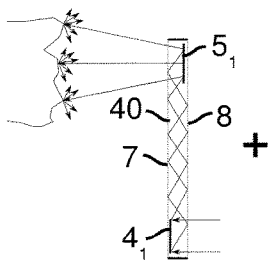
Figure 43A:
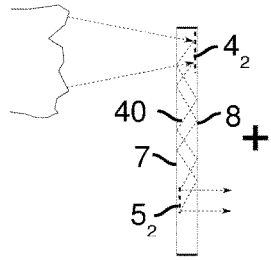
Figure 43A:
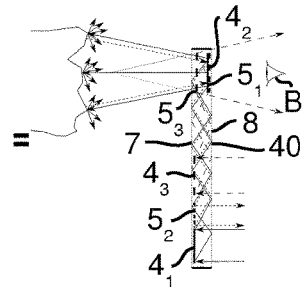

FIG. 43D shows an example of the functionalization of a window 40 in which the illumination function (FIG. 43A), the detection function (FIG. 43B) and the projection function (FIG. 43C) are introduced volume-holographically and the radiation transport is realized in a waveguide-based manner. The different volume holograms for the input coupling region and the output coupling region are differentiated by the index: $4_1$, $4_2$, etc., $5_1$, $5_2$, etc.

Alternatively, individual functions can also be implemented in a non-waveguide-based manner (i.e. by means of free beam propagation approaches).

Figure 44A:
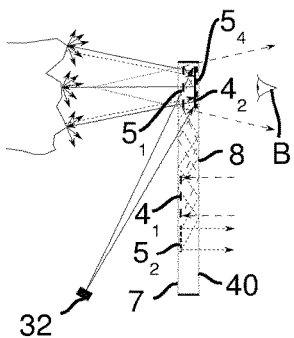
FIGS. 44A-44C show a further variant of the combination of the detection with the projection and/or illumination.
Figure 44B:
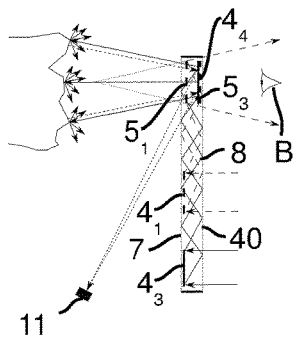
Figure 44C:
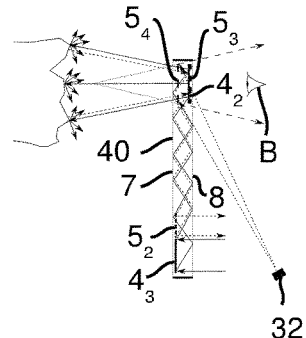
Figure 44D:
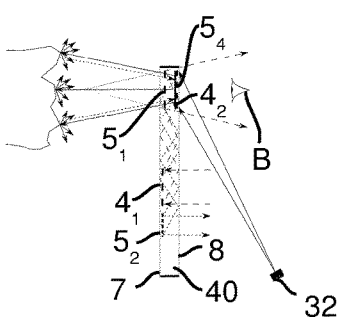
FIGS. 44D-44F show a further variant of the combination of the detection with the illumination and/or projection.
Figure 44E:
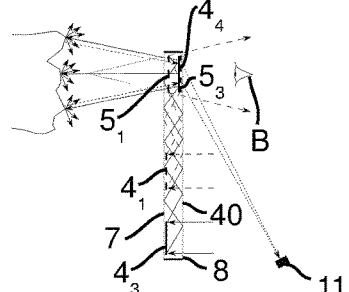
Figure 44F:
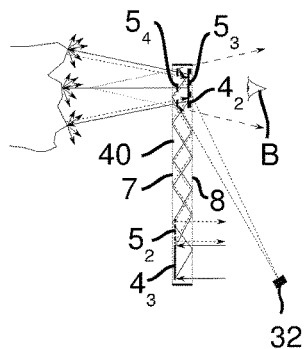

FIG. 44A schematically illustrates this for illumination, FIG. 44B schematically illustrates this for detection and FIG. 44C schematically illustrates this for projection. However, the structural space advantage generated by the waveguiding is (at least partly) lost again in these exemplary embodiments. FIGS. 44A-44C show the described implementations with the respective free beam configurations with reflection volume holograms. This is shown together with transmission volume holograms in FIGS. 44D, 44E and 44F. All functions not realized by free beam propagation are implemented in a waveguide-based manner in FIGS. 44A-44F.

Figure 45:
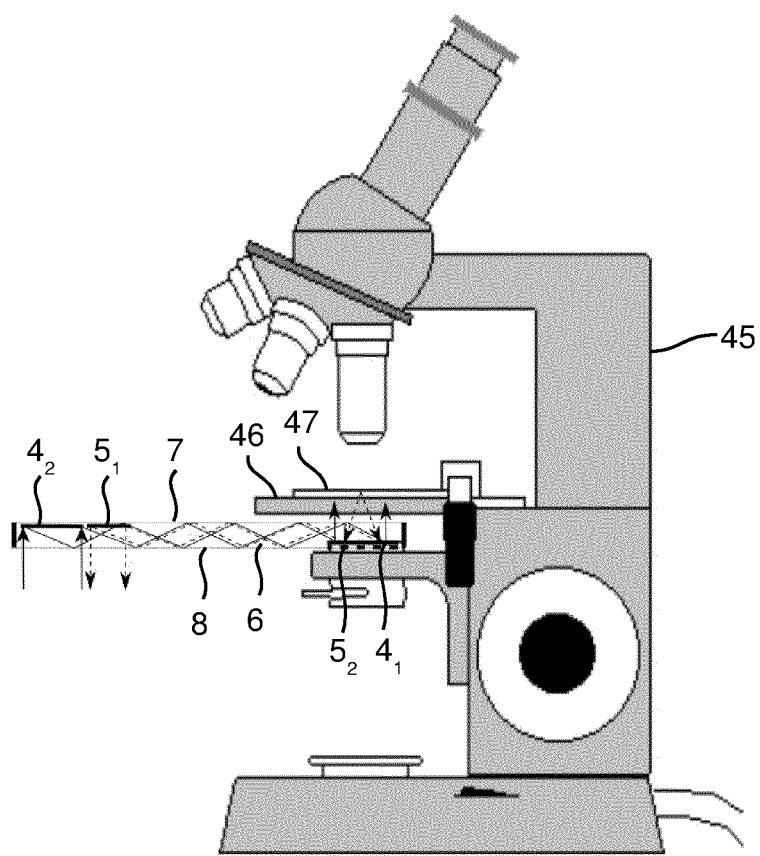
FIG. 45 shows an exemplary embodiment in which the waveguide is used in a microscope.

The extension of the functionality of an optical system is shown in FIG. 45 on the basis of illumination and detection in a microscope 45 for the purpose of recording a sample overview. In this case, radiation is coupled into a waveguide 1 and guided to the volume-holographic output coupling area 5, which then provides for the output coupling of the radiation into the project space (sample carrier 46). The radiation backscattered from the sample 47 is subsequently coupled into the waveguide 1 again by a further volume hologram 4', said waveguide then providing for radiation transport as far as the detector 11.

Given appropriate design of the illumination system of the microscope 45, the waveguide-based system 1 can remain for example as a sample finder in the beam path, without disturbing the transmitted-light illumination beam path. As an alternative to the arrangement shown in FIG. 45, the waveguide-based illumination and imaging system (waveguide 1) can also be fitted above the sample 47. In general the structural space between the objective 48 of the microscope 45 and the sample 47 is greatly restricted, however, in the case of microscopes.

In both variants, the property that illumination and detection are situated at the same location and on the optical axis of the microscope 45 has a positive effect on the overall functionality of the system. As a result of the perpendicular illumination of the sample 47 and the perpendicular detection of the radiation, it is possible to achieve a comparatively high efficiency (detection power/illumination power). A projection function is made available at the same time. This can only be achieved with high outlay and/or much structural space in conventional optical systems. In the case of the functionalized window 40 or the functionalized waveguide 1, a comparable property would be possible only with transparent radiation sources and detectors.

The described embodiments of the waveguide 1 can be used in the field of vehicles (for example automobiles, trucks, motorcycles, etc.).

In order to be able to monitor or observe the external surroundings and the interior of vehicles, more and more optical projection systems such as cameras, for example, are being installed both in the interior and in the exterior. In the course of the change from pure manual control of the vehicle by human beings through assisted driving to autonomous driving, it should be assumed that in the future more and more powerful detectors will be used in the automotive field in order to ensure a comprehensive and safe sensor system. However, these detectors must not stand in the way of aesthetic demands, particularly in the automotive field. Ideally the sensor system is invisible to the customer or the observer of the automobile.

At the present time, optical detection systems are integrated e.g. in the nontransparent region such as the B-pillar, for example. The latter then has only a small opening for the lens. In order to increase freedom for the design and to allow the occupants to have a better view toward the outside, in the future the nontransparent regions of the bodywork will be reduced. Sensors that necessarily have to be fitted in specific regions on the basis of conventional approaches can then no longer be integrated virtually invisibly. This phenomenon is already being manifested now on the optical systems for road sign and lane recognition, which must necessarily be fitted in the upper central region of the windshield in order to be able to determine correct measurement data. With use of traditional optical systems, these create a nontransparent region in the windshield, which can restrict the driver's view and has a negative effect on the appearance of the automobile. With the waveguides described, in the future all windows of the automobile will be able to be equipped with detector areas, without significantly impairing the transparency. In this case, the radiation can be coupled into the window by the input coupling region provided in the window and can be transmitted through waveguides to the detector, which can then be situated in a nontransparent region of the automobile.

FIGS. 46A, 46B, 46C and 46D schematically illustrate various variants of the realization of the waveguide 1 in the windshield 50 of a motor vehicle 51. The input coupling region 4 can be positioned at the desired location in the windshield 50 since it does not significantly influence the transparency of the windshield at this location. The radiation coupled in via the input coupling region 4 is then guided as far as the output coupling region 5 by means of reflections in the windshield 50, which output coupling region can be positioned in a region that is no longer used for viewing through it. The detector system 2 (not shown) can then also be positioned in this region.

Figure 46A:
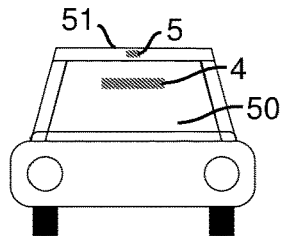
FIGS. 46-46D show exemplary embodiments of the integration of the waveguide or embodiment of the waveguide in a windshield of a vehicle.
Figure 46B:
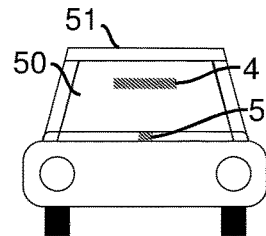
Figure 46C:
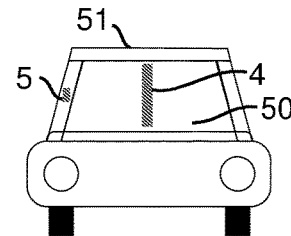
Figure 46D:
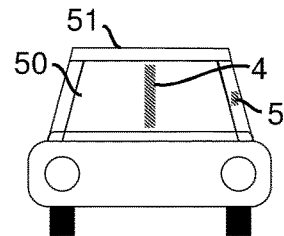

In the variant in accordance with FIG. 46A, the output coupling region 5 is in the region of the roof of the automobile. In the variant in accordance with FIG. 46B, the output coupling region is in the region of the hood or dashboard. Of course, input coupling toward the side is also possible, as shown in FIGS. 46C and 46D, such that then the output coupling region 5 is positioned e.g. in the region of the right (FIG. 46C) or left (FIG. 46D) A-pillar. Consequently, the windshield 50 (or else any other transparent area) can be functionalized with the aid of (volume-)holographic structures and/or micro-optical relief structures in order not to significantly influence the transparency of this area during normal viewing through it in a large wavelength and angular range. By means of the functional implementation described, the radiation from the surroundings or from the interior of the motor vehicle is coupled into the windshield 50. The latter then serves as a waveguide and, by means of total internal reflection, for example, provides for propagation of the radiation to the output coupling region, which then couples out the radiation to the detector system 2. Consequently, the substantially transparent surface of the windshield can be used as a detection area, while the detector 11 can be fitted at an advantageous position in terms of design and/or function. Consequently, the position of the radiation detection and/or radiation capture is no longer tied to the position of the detector 11. This is advantageous particularly if the radiation detection necessarily has to be effected at a specific location, but the latter is simultaneously intended to have a high transparency.

The waveguide system described in association with FIGS. 46A-46D can also be used in the opposite light path for illuminating an object space and/or for projection purposes. In this configuration, the radiation emanating from a static or dynamic source (e.g. light source and/or image source) is coupled into the waveguide, i.e. the window 50, via the output coupling region, which then serves as an input coupling region and is situated in the nontransparent region of the vehicle, and is coupled out again with the aid of the input coupling region 4, which now serves as an output coupling region and is situated in the transparent region.

Of course, it is also possible for the described detection and the described projection and/or illumination to be combined and then for the input coupling and output coupling regions arranged in the transparent region of the windshield to be embodied close together or one above another, as has already been described. An optimized detection can be achieved for a targeted adaptation of the illumination to the detection, in particular spectrally and in an angle-dependent manner.

In the simplest construction of the waveguide 1 (infinite-infinite configuration, recorded at one wavelength), it should be taken into account that in the folding/waveguiding direction at each angle only a specific spectral band is coupled into the waveguide and ultimately coupled out again. If the input coupling and output coupling regions 4, 5 are arranged one above another, for example, as is shown in FIGS. 46A and 46B, an angle- and/or location-dependent color profile results relative to the road in the vertical direction. Upon rotation of the arrangement by +90° (as is illustrated in FIGS. 46C and 46D), the color profile is directed in the horizontal direction (that is to say parallel to the road). Accordingly, the orientation of the input coupling region 4 with respect to the output coupling region 5 should be chosen carefully in accordance with the respective objective. In this case, it is also necessary to take account of the different manifestation of the FoV of the two directions that are perpendicular to one another (given by the size ratio and the distance between the input coupling region 4 and the output coupling region 5 and the spectral sensitivity of the detector).

Furthermore, the inclination of the respective window 50 and the expected position of the object to be detected should be taken into consideration in the design of the input coupling region. In this regard, for example, when observing the driver with the aid of the input coupling region 4 introduced in the windshield, it is necessary to introduce an angular displacement of the vertical FoV in the form of a corresponding deflection function in order that the optical axis in the vertical direction corresponds approximately to the region of the driver's face, and the driver's torso, for example, is not detected. An adaptation to the expected object and the projection thereof can thus be carried out by means of a specific design of the input coupling region 4. The same relationship arises for the use of the waveguide system as illumination. Here the output coupling region 5 should then be adapted to the desired illumination of the object space.

The embodiment for providing an RGB functionality as described in association with FIGS. 10 to 15 is advantageous for the sensor system in the automotive field in order to avoid detection failures in individual angular ranges as a result of the absence of spectral components. It is ensured in this way that in a defined spectral range (ideally the spectral sensitivity of the detector) a signal can be detected at every angle. Furthermore, safety vis à vis detection failures owing to spectral insensitivity of the input coupling region 4 can also be increased by means of the implementation of the input coupling and output coupling regions 4, 5 with the aid of the surface relief structures described.

The variant of the waveguide for enlarging the horizontal FoV as described in association with FIGS. 16 to 20, in which variant the horizontal FoV is increased by encoding in the vertical FoV, can advantageously be used in the automotive field since a horizontal FoV significantly larger than the vertical FoV is often required here.

The variant for increasing the detection efficiency as described in association with FIGS. 21 and 22 can advantageously be used in the automotive field since large areas in the form of the windows are available for the input coupling region 4. Thus, as much beam power as possible can be guided to the detector system 2 and it is also possible to acquire image information under poor lighting conditions.

Furthermore, there is also the possibility of coupling in radiation outside the visual spectral range, for example radiation from the near infrared. With the use of a correspondingly suitable detector system, it is thus possible to acquire image information under illumination conditions that are poor for human beings.

As was described in association with FIGS. 33 to 45, the functionalized waveguide 1 can be functionalized not only for capturing radiation, but also for the illumination of the object space or for projection. For this purpose, the opposite light path is used in comparison with the described detection arrangements by means of the waveguide 1. In this way, the exterior and/or interior region of the vehicle can be illuminated in a targeted manner in order to ensure a reliable detection even under poor lighting conditions. In this regard, it is possible to avoid for example detection failures in individual angular ranges such as can occur with the simplest embodiment of the waveguide 1 when individual spectral ranges are absent. The artificial illumination and the angle-dependent, spectral sensitivity of the input coupling area should be coordinated with one another in this case.

In the case of windshields 50 and rear windows of motor vehicles, today already there is a particularly high demand for detection areas that are situated at defined locations to be made as transparent as possible and for the corresponding detectors or detection systems 2 to be moved to nontransparent regions within the bodywork. This allows a free view for the driver with simultaneous integration of optical sensors for driver assistance systems, whereby safety in road traffic can be increased. Besides detection in the exterior region, the functionalization described above also makes it possible to acquire image information in the interior of the vehicle. With the image sequences thus obtained, in combination with corresponding data processings, it is possible to implement further safety systems such as e.g. fatigue recognition or gesture control. Identification of the driver and/or occupants without a visible opening for a camera is also possible in this way.

In the same way as in the windshield and the rear window, it is possible to accommodate output coupling areas and detectors in the case of fixed side windows, too, in framing bodywork regions. Here, too, the additional functionalization can serve for acquiring image information in the interior and exterior regions, without substantially influencing the transparency of the surface.

It is also possible to integrate a plurality of detection systems in different windows of a vehicle. In this way, it is possible to determine the position as in the case of a three-dimensional coordinate system of persons and objects in space (keyword: tomography and thus measurement from a plurality of perspectives).

The arrangement of the functionalized areas and of the detector can likewise be applied to the illumination design. In this case, however, the output coupling area, i.e. the emitting area, is situated in the transparent region and the input coupling area including the radiation source is situated in the nontransparent region.

Given a suitable design of the detection and/or illumination system, the output coupling area of the illumination system can coincide with the input coupling area of the detection system.

Figure 47A:
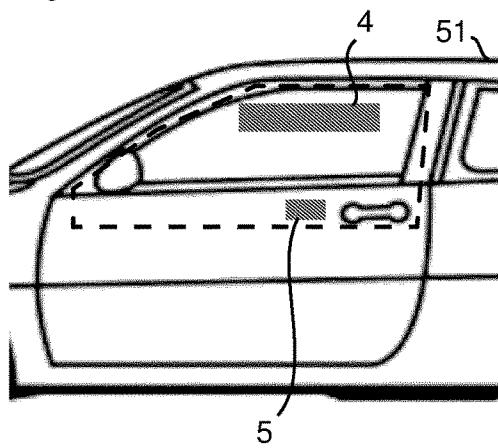
FIGS. 47A-47C show variants of the integration of the waveguide according to the invention in a side view of an automobile.
Figure 47B:
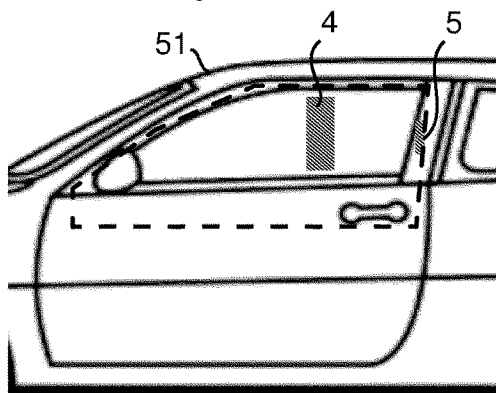
Figure 47C:
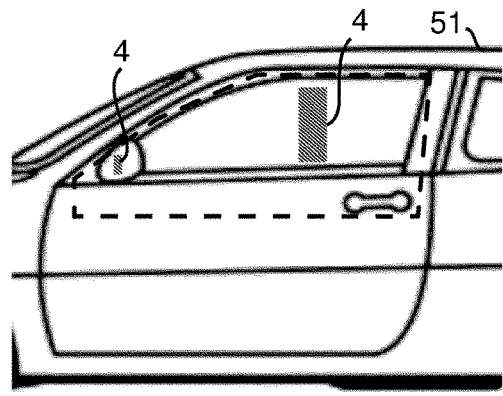

In comparison with fixed windows, the arrangement of the output coupling area in the case of displaceable windows is preferably chosen such that it lies in regions which are not situated within the bodywork or are not situated within a nontransparent region even during or after the movement. In addition, the detection system must be fixedly connected to the movable window in order to ensure the detection function even during or after the movement. FIGS. 47A-47C illustrate various arrangements of the input coupling and output coupling regions on the basis of the example of a movable side window.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A functionalized waveguide for a detector system, comprising:
    a transparent base body having a front side and a rear side, wherein the base body comprises a partly transparent input coupling region and a output coupling region spaced apart therefrom in a first direction,
    wherein the input coupling region comprises a diffractive structure which deflects only a portion of radiation coming from an object to be detected and impinging on the front side, such that the deflected portion propagates as coupled-in radiation in the base body as far as the output coupling region via reflections and impinges on the output coupling region,
    wherein the output coupling region deflects at least one portion of the coupled-in radiation impinging thereon, such that the deflected portion emerges from the base body via the front side or rear side in order to impinge on the detector system, and
    wherein an extent of the input coupling region in a second direction transverse to the first direction is greater than an extent of the output coupling region in the second direction,
    wherein the input coupling region and the output coupling region are each formed as a volume hologram,
    wherein the diffractive structure of the input coupling region deflects in the first direction the portion of radiation coming from the object to be detected without deflecting in the second direction the portion of radiation coming from the object to be detected,
    wherein the output coupling region comprises an optical imaging function in addition to the beam deflection, said optical imaging function being provided by the volume hologram, and
    wherein the output coupling region serves as a pupil of the functionalized waveguide.

2. The waveguide of claim 1, wherein the diffractive structure transmits a portion of the radiation coming from the object to be detected and impinging on the front side, such that said portion emerges from the base body via the rear side.

3. The waveguide of claim 1, wherein the input coupling region and the output coupling region are arranged in a manner centered with respect to one another in the second direction.

4. The waveguide of claim 1, wherein the input coupling region and the output coupling region are arranged in a manner decentered with respect to one another in the second direction.

5. The waveguide of claim 4, comprising a plurality of output coupling regions arranged next to one another in the second direction.

6. The waveguide of claim 5, in which at least one of the output coupling regions additionally comprises a function of deflection transversely to the first direction.

7. The waveguide of claim 1, wherein the input coupling region has a transmission of at least 50% for the radiation coming from the object to be detected and impinging on the front side.

8. A detector system, comprising the functionalized waveguide of claim 1.

9. The detector system of claim 8, further comprising a detector, on which that portion of the radiation which is deflected by the output coupling region impinges.

10. The detector system of claim 9, wherein the detector is connected to the front or rear side of the base body.

11. The detector system of claim 8, wherein no separate imaging optical element is arranged between the detector and the front and/or rear side.

12. The waveguide of claim 1, wherein said optical imaging function realizes the function of a converging lens element.

13. The waveguide of claim 1, wherein said optical imaging function realizes the function of a diverging lens element.

14. The waveguide of claim 1, wherein said optical imaging function realizes the function of a concave mirror.

15. The waveguide of claim 1, wherein said optical imaging function realizes the function of a convex mirror.

16. The waveguide of claim 1, wherein said optical imaging function realizes the function of at least one curved surface of a converging lens element, of a diverging lens element, of a concave mirror or of a convex mirror, wherein said at least one curved surface is spherically curved.

17. The waveguide of claim 1, wherein said optical imaging function realizes the function of at least one aspherically curved surface of a converging lens element, of a diverging lens element, of a concave mirror or of a convex mirror.

18. The waveguide of claim 1, wherein said optical imaging function realizes the function of at least one curved surface of a converging lens element, of a diverging lens element, of a concave mirror or of a convex mirror, wherein said at least one curved surface is decentered.

19. An illumination and/or projection system, comprising:
a functionalized waveguide, comprising a transparent base body having a front side and a rear side, wherein the base body comprises an input coupling region and an output coupling region spaced apart therefrom in a first direction,
wherein the input coupling region deflects at least one portion of radiation coming from a light or an image source of the illumination and/or projection system and impinging on the input coupling region, such that the deflected portion propagates as coupled-in radiation in the base body as far as the output coupling region via reflections and impinges on the output coupling region,
wherein the output coupling region comprises a diffractive structure, which deflects at least one portion of the coupled-in radiation impinging thereon, such that the deflected portion emerges from the base body via the front side or rear side, and
wherein the extent of the output coupling region in a second direction transverse to the first direction is greater than the extent of the input coupling region in the second direction,
wherein the input coupling region and the output coupling region are each formed as a volume hologram,
wherein the diffractive structure of the input coupling region deflects in the first direction the portion of radiation coming from the object to be detected without deflecting in the second direction the portion of radiation coming from the object to be detected,
wherein the input coupling region and/or the output coupling region comprises an optical imaging function in addition to the beam deflection, said optical imaging function being provided by the volume hologram, and
wherein the output coupling region serves as a pupil of the functionalized waveguide.

20. The illumination and/or projection system of claim 19, further comprising a light and/or image source, wherein light from the light and/or image source impinges on the input coupling region.

21. A functionalized waveguide for a detector system, comprising:
a transparent base body having a front side and a rear side, wherein the base body comprises a partly transparent input coupling region and an output coupling region spaced apart therefrom in a first direction,
wherein the input coupling region comprises a diffractive structure which deflects only a portion of radiation coming from an object to be detected and impinging on the front side, such that the deflected portion propagates as coupled-in radiation in the base body as far as the output coupling region via reflections and impinges on the output coupling region,
wherein the output coupling region deflects at least one portion of the coupled-in radiation impinging thereon, such that the deflected portion emerges from the base body via the front side or rear side in order to impinge on the detector system, and
wherein an extent of the input coupling region in a second direction transverse to the first direction is greater than an extent of the output coupling region in the second direction,
wherein the input coupling region and the output coupling region are each formed as a volume hologram, and
wherein the input coupling region does not comprise an optical imaging function in addition to the beam deflection, and
wherein the output coupling region comprises an optical imaging function in addition to the beam deflection, said optical imaging function being provided by the volume hologram.

* * * * *